(12) United States Patent
Nagaraj et al.

(10) Patent No.: US 11,362,719 B2
(45) Date of Patent: Jun. 14, 2022

(54) MULTI-LEVEL BEAM SCHEDULING IN A WIRELESS COMMUNICATIONS CIRCUIT, PARTICULARLY FOR A WIRELESS COMMUNICATIONS SYSTEM (WCS)

(71) Applicant: Corning Research & Development Corporation, Corning, NY (US)

(72) Inventors: Shirish Nagaraj, Pleasanton, CA (US); Deepak Pengoria, Milpitas, CA (US); Hsien Li Woo, San Diego, CA (US)

(73) Assignee: Corning Research & Development Corporation, Corning, NY (US)

( * ) Notice: Subject to any disclaimer, the term of this patent is extended or adjusted under 35 U.S.C. 154(b) by 29 days.

(21) Appl. No.: 16/837,531

(22) Filed: Apr. 1, 2020

(65) Prior Publication Data
US 2021/0314048 A1    Oct. 7, 2021

(51) Int. Cl.
| | |
|---|---|
| *H04B 7/06* | (2006.01) |
| *H04W 72/04* | (2009.01) |
| *H04W 16/28* | (2009.01) |
| *H04B 7/0408* | (2017.01) |
| *H04W 80/02* | (2009.01) |
| *H04W 76/27* | (2018.01) |

(Continued)

(52) U.S. Cl.
CPC ......... *H04B 7/0695* (2013.01); *H04B 7/0408* (2013.01); *H04W 16/28* (2013.01); *H04W 72/046* (2013.01); *H04W 72/0446* (2013.01); *H04W 76/27* (2018.02); *H04W 80/02* (2013.01); *H04W 80/06* (2013.01); *H04W 80/08* (2013.01)

(58) Field of Classification Search
CPC ... H04B 7/0695; H04B 7/0408; H04W 16/28; H04W 76/27; H04W 72/046; H04W 80/06; H04W 80/02; H04W 72/0446; H04W 80/08
See application file for complete search history.

(56) References Cited

U.S. PATENT DOCUMENTS

| | | | |
|---|---|---|---|
| 8,310,975 B2 | 11/2012 | Sundaresan et al. | |
| 9,960,823 B2 * | 5/2018 | Kim ..................... | H04B 7/0695 |

(Continued)

FOREIGN PATENT DOCUMENTS

WO      2017008257 A1     1/2017

*Primary Examiner* — Afshawn M Towfighi
(74) *Attorney, Agent, or Firm* — C. Keith Montgomery

(57) ABSTRACT

Multi-level beam scheduling in a wireless communications circuit, particularly for a wireless communications system (WCS), is disclosed. The WCS includes a central unit(s) and a wireless communications circuit(s) configured to reduce beamforming overhead and improve radio frequency (RF) coverage in a wireless communications cell(s) based on a multi-level beam scheduling scheme. In a non-limiting example, the multi-level beam scheduling scheme includes a first level (L1) scheduler, a second level (L2) scheduler, and a third level (L3) scheduler configured to perform cross-cell beam scheduling, in-cell beam scheduling, and in-beam user equipment (UE) scheduling, respectively. By employing the multi-level beam scheduling scheme in the WCS, it may be possible to reduce processing overhead and improve resource usage, data throughput, and system adaptability of the wireless communications circuit(s), thus helping to optimize capacity and throughput in the wireless communications cell(s).

13 Claims, 13 Drawing Sheets

(51) Int. Cl.
*H04W 80/08* (2009.01)
*H04W 80/06* (2009.01)

(56) References Cited

U.S. PATENT DOCUMENTS

2017/0214444 A1* 7/2017 Nigam .................... H04B 7/063
2019/0166527 A1* 5/2019 Oketani ............... H04B 7/0634

* cited by examiner

MULTI-LEVEL BEAM SCHEDULING IN A WIRELESS COMMUNICATIONS CIRCUIT, PARTICULARLY FOR A WIRELESS COMMUNICATIONS SYSTEM (WCS)

BACKGROUND

The disclosure relates generally to a wireless communications apparatus(es), such as a remote unit(s), a remote radio head(s), or a mobile device(s), particularly in a wireless communications system (WCS), such as a distributed communications system (DCS), a small cell radio access network (RAN), or a distributed antenna system (DAS), configured to support radio frequency (RF) beamforming.

Wireless customers are increasingly demanding wireless communications services, such as cellular communications services and Wireless Fidelity (Wi-Fi) services. Thus, small cells, and more recently Wi-Fi services, are being deployed indoors. At the same time, some wireless customers use their wireless communications devices in areas that are poorly serviced by conventional cellular networks, such as inside certain buildings or areas where there is little cellular coverage. One response to the intersection of these two concerns has been the use of DCSs as WCSs, such as a small cell RAN or DAS. DCSs include a central unit or node that is configured to transmit or distribute communications signals to remote units typically over physical medium, such as electrical conductors or optical fiber. The remote units are configured to receive and distribute such communications signals to client devices within the antenna range of the remote unit. DCSs can be particularly useful when deployed inside buildings or other indoor environments where the wireless communications devices may not otherwise be able to effectively receive radio frequency (RF) signals from a source.

In this regard, FIG. 1 illustrates a DCS 100 that is configured to distribute communications services to remote coverage areas 102(1)-102(N), where 'N' is the number of remote coverage areas. The DCS 100 in FIG. 1 is provided in the form of a wireless DCS, such as a DAS 104 in this example. The DAS 104 can be configured to support a variety of communications services that can include cellular communications services, wireless communications services, such as RF identification (RFID) tracking, Wi-Fi, local area network (LAN), and wireless LAN (WLAN), wireless solutions (Bluetooth, Wi-Fi Global Positioning System (GPS) signal-based, and others) for location-based services, and combinations thereof, as examples. The remote coverage areas 102(1)-102(N) are created by and centered on remote units 106(1)-106(N) connected to a central unit 108 (e.g., a head-end controller, a central unit, or a head-end unit). The central unit 108 may be communicatively coupled to a source transceiver 110, such as for example, a base transceiver station (BTS) or a baseband unit (BBU). In this regard, the central unit 108 receives downlink communications signals 112D from the source transceiver 110 to be distributed to the remote units 106(1)-106(N). The downlink communications signals 112D can include data communications signals and/or communications signaling signals, as examples. The central unit 108 is configured with filtering circuits and/or other signal processing circuits that are configured to support a specific number of communications services in a particular frequency bandwidth (i.e., frequency communications bands). The downlink communications signals 112D are communicated by the central unit 108 over a communications link 114 over their frequency to the remote units 106(1)-106(N).

With continuing reference to FIG. 1, the remote units 106(1)-106(N) are configured to receive the downlink communications signals 112D from the central unit 108 over the communications link 114. The downlink communications signals 112D are configured to be distributed to the respective remote coverage areas 102(1)-102(N) of the remote units 106(1)-106(N). The remote units 106(1)-106(N) are also configured with filters and other signal processing circuits that are configured to support all or a subset of the specific communications services (i.e., frequency communications bands) supported by the central unit 108. In a non-limiting example, the communications link 114 may be a wired communications link, a wireless communications link, or an optical fiber-based communications link. The remote units 106(1)-106(N) may include RF transmitter/receiver circuits 116(1)-116(N) and antennas 118(1)-118(N), respectively. The antennas 118(1)-118(N) are operably connected to the RF transmitter/receiver circuits 116(1)-116(N) to wirelessly distribute the communications services to user equipment (UE) 120 within the respective remote coverage areas 102(1)-102(N). The remote units 106(1)-106(N) are also configured to receive uplink communications signals 112U from the UE 120 in the respective remote coverage areas 102(1)-102(N) to be distributed to the source transceiver 110.

Conventionally, the remote units 106(1)-106(N) may be configured to communicate the downlink communications signals 112D and the uplink communications signals 112U with the UE 120 based on a third-generation (3G) wireless communication technology, such as wideband code-division multiple access (WCDMA), and/or a fourth-generation (4G) wireless communication technology, such as long-term evolution (LTE). As wireless communication technology continues to evolve, a new fifth-generation (5G) new-radio (NR) (5G-NR) wireless communication technology has emerged as a next generation wireless communication technology having the potential of achieving significant improvement in data throughput, coverage range, signal efficiency, and access latency over the existing 3G and 4G wireless communication technologies. As such, it may be necessary to upgrade or reconfigure the remote units 106(1)-106(N) to communicate the downlink communications signals 112D and the uplink communications signals 112U with the UE 120 based on the 5G-NR wireless communication technologies.

The 5G-NR wireless communication technology may be implemented based on a millimeter-wave (mmWave) spectrum that is typically higher than 6 GHz, which makes the downlink communications signals 112D and the uplink communications signals 112U more susceptible to propagation loss. As such, radio frequency (RF) beamforming has become a core ingredient of the 5G-NR wireless communication technology to help mitigate signal propagation loss in the mmWave spectrum. In this regard, the antennas 118(1)-118(N) may be replaced by an equal number of antenna arrays (not shown) each including multiple antennas (e.g., 4×4, 8×8, 16×16, etc.). Accordingly, the remote units 106(1)-106(N) may be configured to communicate the downlink communications signals 112D and the uplink communications signals 112U by forming and steering RF beams 122(1)-122(N) toward the UE 120. By forming and steering the RF beams 122(1)-122(N) toward the UE 120, the remote units 106(1)-106(N) may communicate the downlink communications signals 112D and the uplink communications signals 112U with higher equivalent isotropically radiated power (EIRP) and signal-to-interference-plus-noise ratio (SINR), thus helping to mitigate the propagation loss in the mmWave spectrum.

No admission is made that any reference cited herein constitutes prior art. Applicant expressly reserves the right to challenge the accuracy and pertinency of any cited documents.

SUMMARY

Embodiments disclosed herein include multi-level beam scheduling in a wireless communications circuit, particularly for a wireless communications system (WCS). The WCS includes a central unit(s) and a wireless communications circuit(s) configured to reduce beamforming overhead and improve radio frequency (RF) coverage in a wireless communications cell(s) based on a multi-level beam scheduling scheme. In a non-limiting example, the multi-level beam scheduling scheme includes a first level (L1) scheduler, a second level (L2) scheduler, and a third level (L3) scheduler configured to perform cross-cell beam scheduling, in-cell beam scheduling, and in-beam user equipment (UE) scheduling, respectively. Specifically, the L1 scheduler can be a macro-level scheduler for coordinating RF beamforming across different wireless communications cells in the WCS, the L2 scheduler can be a mid-level scheduler for scheduling RF beamforming in a particular wireless communications cell in the WCS, and the L3 scheduler can be a micro-level scheduler for scheduling different UEs to communicate via a specific RF beam in a specific wireless communications cell in the WCS. The L1, L2, and L3 schedulers may be enabled by a number of circuits distributed between the central unit(s) and the wireless communications circuit(s) to improve scalability of the WCS. By employing the multi-level beam scheduling scheme in the WCS, it may be possible to reduce processing overhead and improve resource usage, data throughput, and system adaptability of the wireless communications circuit(s), thus helping to optimize capacity and throughput in the wireless communications cell(s).

One exemplary embodiment of the disclosure relates to a wireless communications circuit. The wireless communications circuit includes an antenna array configured to form a plurality of RF beams in a plurality of time slots to radiate an RF communications signal to a plurality of UEs in a wireless communications cell. The wireless communications circuit also includes a beam control circuit. The beam control circuit is configured to determine at least one selected RF beam among the plurality of RF beams to be formed in a selected time slot among the plurality of time slots. The beam control circuit is also configured to cause the antenna array to form the at least one selected RF beam in the selected time slot. The wireless communications circuit also includes a signal control circuit. The signal control circuit is configured to schedule one or more UEs among the plurality of UEs to communicate the RF communications signal via the at least one selected RF beam.

An additional exemplary embodiment of the disclosure relates to a method for performing multi-level beam scheduling in a wireless communications circuit. The method includes radiating an RF communications signal to a plurality of UEs in a wireless communications cell by forming a plurality of RF beams in a plurality of time slots. The method also includes determining at least one selected RF beam among the plurality of RF beams to be formed in a selected time slot among the plurality of time slots. The method also includes forming the at least one selected RF beam in the selected time slot. The method also includes scheduling one or more UEs among the plurality of UEs to communicate the RF communications signal via the at least one selected RF beam.

An additional exemplary embodiment of the disclosure relates to a WCS. The WCS includes at least one central unit. The WCS also includes a plurality of remote units coupled to the at least one central unit via a plurality of communications mediums. The plurality of remote units is configured to receive a plurality of downlink digital communications signals from the at least one central unit via the plurality of communications mediums, respectively. The plurality of remote units is also configured to convert the plurality of downlink digital communications signals into a plurality of downlink RF communications signals, respectively. The plurality of remote units is also configured to distribute the plurality of downlink RF communications signals in a plurality of wireless communications cells, respectively. The plurality of remote units is also configured to receive a plurality of uplink RF communications signals from the plurality of wireless communications cells, respectively. The plurality of remote units is also configured to convert the plurality of uplink RF communications signals into a plurality of uplink digital communications signals, respectively. The plurality of remote units is also configured to provide the plurality of uplink digital communications signals to the at least one central unit via the plurality of communications mediums, respectively. At least one remote unit among the plurality of remote units includes an antenna array configured to form a plurality of RF beams in a plurality of time slots to radiate an RF communications signal among the plurality of downlink RF communications signals to a plurality of UEs in a wireless communications cell among the plurality of wireless communications cells. The at least one remote unit also includes a beam control circuit. The beam control circuit is configured to determine at least one selected RF beam among the plurality of RF beams to be formed in a selected time slot among the plurality of time slots. The beam control circuit is also configured to cause the antenna array to form the at least one selected RF beam in the selected time slot. The at least one remote unit also includes a signal control circuit. The signal control circuit is configured to schedule one or more UEs among the plurality of UEs to communicate the RF communications signal via the at least one selected RF beam.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments disclosed herein include multi-level beam scheduling in a wireless communications circuit, particularly for a wireless communications system (WCS). The WCS includes a central unit(s) and a wireless communications circuit(s) configured to reduce beamforming overhead and improve radio frequency (RF) coverage in a wireless communications cell(s) based on a multi-level beam scheduling scheme. In a non-limiting example, the multi-level beam scheduling scheme includes a first level (L1) scheduler, a second level (L2) scheduler, and a third level (L3) scheduler configured to perform cross-cell beam scheduling, in-cell beam scheduling, and in-beam user equipment (UE) scheduling, respectively. Specifically, the L1 scheduler can be a macro-level scheduler for coordinating RF beamforming across different wireless communications cells in the WCS, the L2 scheduler can be a mid-level scheduler for scheduling RF beamforming in a particular wireless communications cell in the WCS, and the L3 scheduler can be a micro-level scheduler for scheduling different UEs to communicate via a specific RF beam in a specific wireless communications cell in the WCS. The L1, L2, and L3 schedulers may be enabled by a number of circuits distributed between the central unit(s) and the wireless communications circuit(s) to improve scalability of the WCS. By employing the multi-level beam scheduling scheme in the WCS, it may be possible to reduce processing overhead and improve resource usage, data throughput, and system adaptability of the wireless communications circuit(s), thus helping to optimize capacity and throughput in the wireless communications cell(s).

Figure 1:
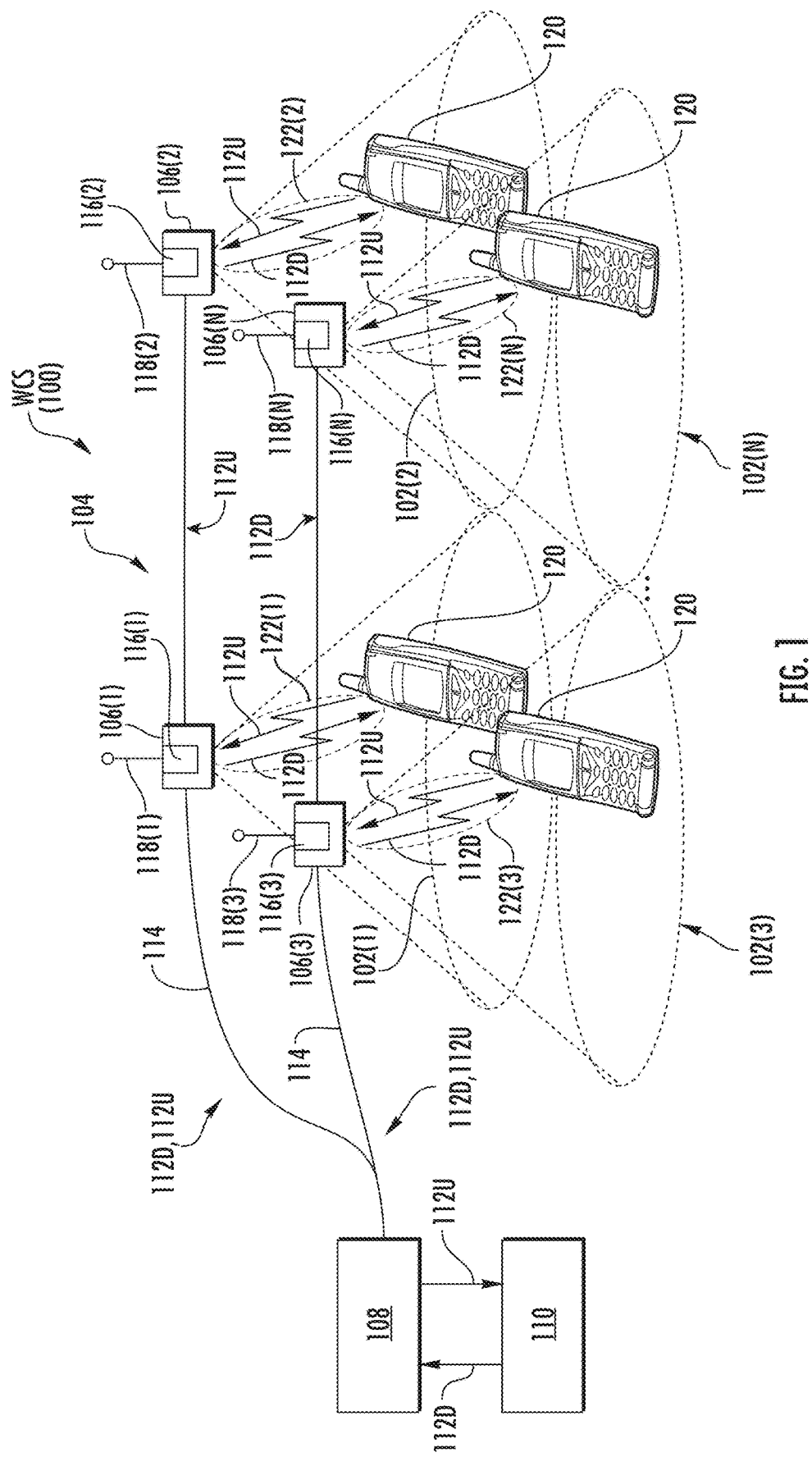
FIG. 1 is a schematic diagram of an exemplary wireless communications system (WCS), such as a distributed communications system (DCS), configured to distribute communications services to remote coverage areas.
Figure 2A:
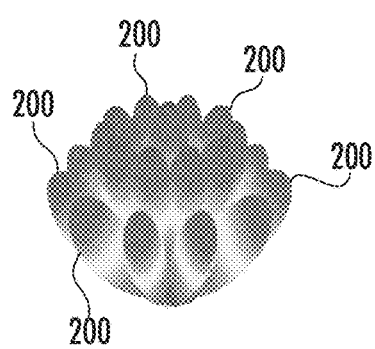
FIGS. 2A-2C are graphic diagrams providing exemplary illustrations of a number of fundamental aspects related to radio frequency (RF) beamforming.
Figure 2B:
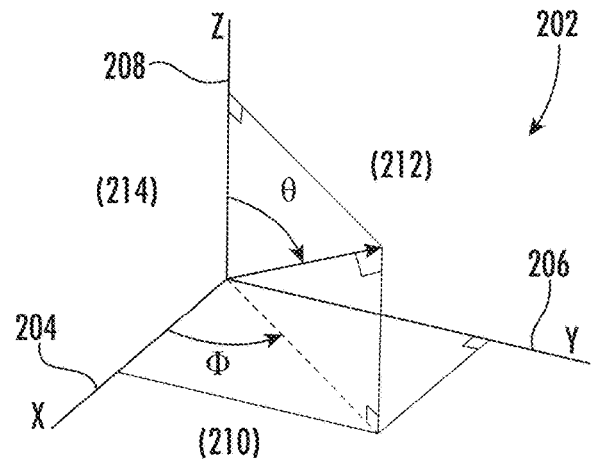
Figure 2C:
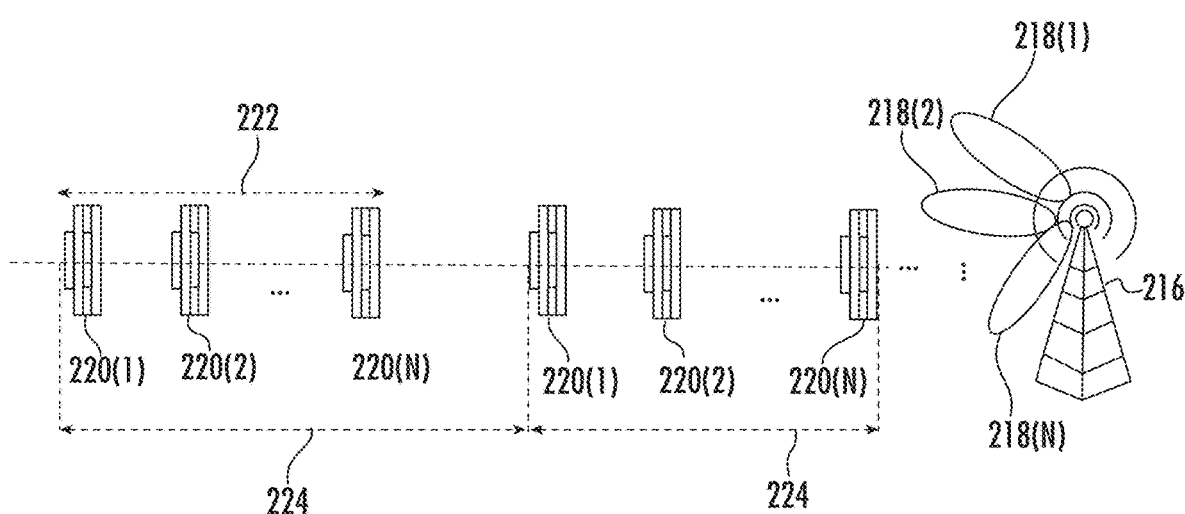
Figure 3:
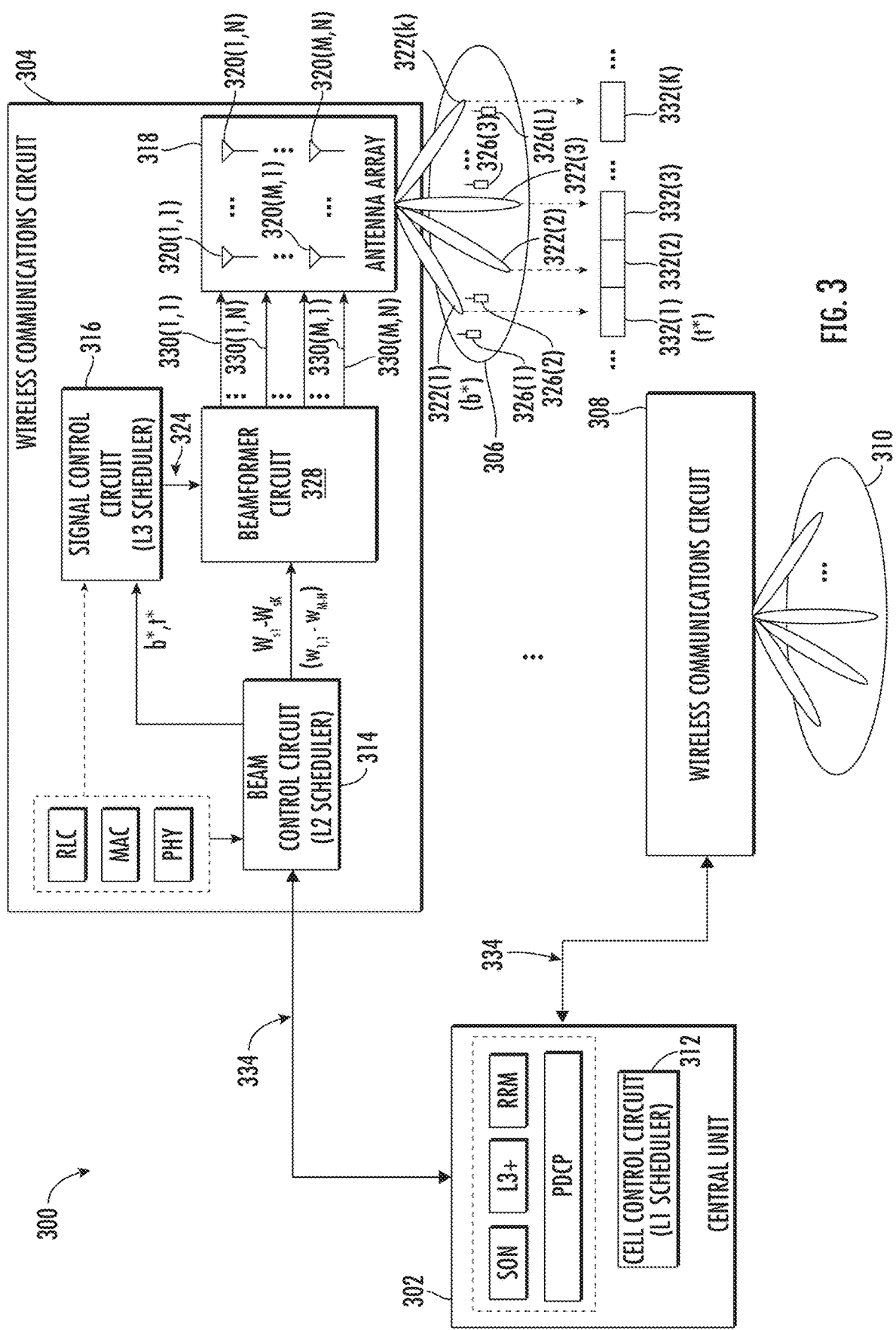
FIG. 3 is a schematic diagram of an exemplary WCS that includes a central unit and at least one wireless communications circuit configured to reduce beamforming overhead and improve capacity and throughput based on a multi-level beam scheduling scheme.

Before discussing a wireless communications circuit of the present disclosure configured to improve coverage in a wireless communications cell via multi-level beam scheduling starting at FIG. 3, a brief overview is first provided with reference to FIGS. 2A-2C to help explain some fundamental aspects related to RF beamforming.

FIGS. 2A-2C are graphic diagrams providing exemplary illustration of a number of fundamental aspects related to RF beamforming. In general, beamforming refers to a technique that uses multiple antennas to simultaneously radiate an RF signal in an RF spectrum, such as a millimeterwave (mm-Wave) spectrum. The multiple antennas, also called "antenna elements," that are typically organized into an antenna array (e.g., 4×4, 8×8, 16×16, etc.) and separated from each other by at least one-half (½) wavelength. The RF signal is pre-processed based on a beam weight set, which includes multiple beam weights corresponding to the multiple antennas, respectively, to generate multiple weighted RF signals. The multiple weighted RF signals are then coupled to specific antennas in the antenna array for simultaneous radiation in the RF spectrum. As illustrated in FIG. 2A, by pre-processing the RF signal based on multiple beam weight sets, it may be possible to form multiple RF beams 200 pointing to multiple directions radiating from antenna elements in an antenna array, respectively.

Each beam weight in a given beam weight set is a complex weight consisting of a respective phase term and a respective amplitude term. The phase terms in the complex beam weight can be determined to cause the multiple simultaneously radiated RF signals to constructively combine in one direction to form the RF beams 200, while destructively averaging out in other directions. In this regard, the phase term can determine how the RF beams 200 are formed and in which direction the RF beams 200 are pointing. On the other hand, the amplitude terms in the complex beam weight may determine how many of the antennas in the antenna array are utilized to simultaneously radiate the RF signals. Notably, when more antennas are utilized to simultaneously radiate the RF signals, the RF beams 200 will become more concentrated to have a narrower beamwidth and a higher beamformed antenna gain. In contrast, when fewer antennas are utilized to simultaneously radiate the RF signals, the RF beams 200 will become more spread out to have a wider beamwidth and a less beam-formed antenna gain. In this regard, the amplitude term can determine the beamwidth of the RF beams 200.

FIG. 2B is a graphic diagram of an exemplary spherical coordinate system 202 that helps explain how the complex beam weight can be determined. The spherical coordinate system 202 includes an x-axis (X) 204, a y-axis (Y) 206, and a z-axis (Z) 208. The x-axis 204 and the y-axis 206 collectively define an x-y plane 210, the y-axis 206 and the z-axis 208 collectively define a y-z plane 212, and the x-axis 204 and the z-axis 208 collectively define an x-z plane 214. Depending how the multiple antennas are arranged in the antenna array, a beam weight $w_n$ may be determined based equations (Eq. 1-Eq. 4) below.

The equation (Eq. 1) below illustrates how a beam weight $w_n$ may be determined when the multiple antennas in the antenna array are arranged linearly along the y-axis 206.

$$w_n = e^{-j2\pi n \cdot \frac{dy}{\lambda} \cdot \sin\theta} \quad (0 \leq n \leq N-1) \quad \text{(Eq. 1)}$$

In the equation (Eq. 1) above, 'N' represents a total number of the antennas in the antenna array, and θ represents a zenith angle. The equation (Eq. 2) below illustrates how a beam weight $w_{m,n}$ may be determined when the multiple antennas in the antenna array are arranged in an M×N matrix in the x-y plane 210 in FIG. 2B.

$$w_{m,n} = e^{-j2\pi m \cdot \frac{dx}{\lambda} \cdot \sin\theta\cos\phi} e^{-j2\pi n \cdot \frac{dy}{\lambda} \cdot \sin\theta\sin\phi} \quad \text{(Eq. 2)}$$
$$(0 \leq m \leq M-1, 0 \leq n \leq N-1)$$

In the equation (Eq. 2) above, M and N represent the number of rows and the number of columns of M×N matrix, respectively, and φ represents an azimuth angle. The equation (Eq. 3) below illustrates how the beam weight $w_{m,n}$ may be determined when the multiple antennas in the antenna array are arranged in an M×N matrix in the y-z plane 212.

$$w_{m,n} = e^{-j2\pi m \cdot \frac{dz}{\lambda} \cdot \cos\theta} e^{-j2\pi n \cdot \frac{dy}{\lambda} \cdot \sin\theta\sin\phi} \quad \text{(Eq. 3)}$$
$$(0 \leq m \leq M-1, 0 \leq n \leq N-1)$$

The equation (Eq. 4) below illustrates how the beam weight $w_{m,n}$ may be determined when the multiple antennas in the antenna array are arranged in an M×N matrix in the x-z plane 214.

$$w_{m,n} = e^{-j2\pi m \cdot \frac{dx}{\lambda} \cdot \sin\theta\cos\phi} e^{-j2\pi n \cdot \frac{dz}{\lambda} \cdot \cos\theta} \quad \text{(Eq. 4)}$$
$$(0 \leq m \leq M-1, 0 \leq n \leq N-1)$$

Although it may be possible for the antennas in an antenna array to form the multiple RF beams 200 in FIG. 2A in the multiple directions, an actual number of the RF beams 200 is typically limited by a standard-defined parameter known as the synchronization signal block (SSB), which is further discussed next in FIG. 2C. In this regard, FIG. 2C is a graphic diagram providing an exemplary illustration on how the SSB limits the actual number the RF beams 200 that may be formed by the antennas in the antenna array.

In conventional wireless systems, such as the third-generation (3G) and the fourth-generation (4G) wireless systems, a base station is typically configured to radiate a cell-wide reference signal omnidirectionally to enable cell discovery and coverage measurement by a user equipment (UE). However, a fifth-generation new-radio (5G-NR) wireless system does not provide the cell-wide reference signal. Instead, as shown in FIG. 2C, a 5G-NR gNB 216 is configured to radiate a number of reference beams 218(1)-218(N) in different directions of a 5G-NR coverage cell. The reference beams 218(1)-218(N) are associated with a number of SSBs 220(1)-220(N), respectively. Each of the SSBs 220(1)-220(N) may include a primary synchronization signal (PSS), a secondary synchronization signal (SSS), and a 5G-NR physical broadcast channel (PBCH).

In this regard, a 5G-NR UE in the 5G-NR coverage cell can sweep through the reference beams 218(1)-218(N) to identify a candidate reference beam(s) associated with a strongest reference signal received power (RSRP). Further, the 5G-NR UE may decode a candidate SSB(s) associated with the identified candidate reference beam(s) to acquire such information as physical cell identification (PCI) and a PBCH demodulation reference signal (DMRS). Based on the candidate reference beam(s) reported by the 5G-NR UE, the 5G-NR gNB 216 may pin point a location of the 5G-NR UE and steer a data-bearing RF beam toward the 5G-NR UE to enable data communication with the 5G-NR UE.

The SSBs 220(1)-220(N) may be organized into an SSB burst set 222 to be repeated periodically in a number of SSB burst periods 224. The SSB burst set 222 may be five-milliseconds (5 ms) in duration, and the SSB burst periods 224 may repeat every twenty milliseconds (20 ms). The beamforming standard, as presently defined by the third-generation partnership project (3GPP), allows a maximum of 64 SSBs to be scheduled in the SSB burst set 222. Accordingly, the 5G-NR gNB 216 can radiate 64 reference beams 218(1)-218(N) in each of the SSB burst periods 224.

Understandably, the 5G-NR gNB 216 will be able to maximize coverage in the 5G-NR coverage cell by radiating the maximum number (e.g., 64) of the reference beams 218(1)-218(N) in each of the SSB burst periods 224. However, radiating the maximum number of the reference beams 218(1)-218(N) can introduce significant overhead in terms of computational complexity and processing delay. As such, it may be desirable to maximize coverage in the 5G-NR coverage cell by radiating as few of the reference beams 218(1)-218(N) as possible.

In addition to radiating the reference beams 218(1)-218(N) in each of the SSB burst periods 224 to enable the 5G-NR UE(s) to identify the candidate reference beam(s) in the wireless communications cell, the 5G-NR gNB 216 also needs to form the data-bearing RF beam(s) to enable data communication with the 5G-NR UE(s). Understandably, the more data-bearing RF beams the 5G-NR gNB 216 can form at a given time instance, the more 5G-NR UEs can communicate with the 5G-NR gNB 216, and therefore the higher the data throughput may be achieved in the wireless communications cell. However, the 5G-NR gNB 216 may need to include multiple transceiver circuits to form multiple data bearing RF beams at the given time instance, which can lead to a significant increase in cost and power consumption. In this regard, it may be further desirable radiate less data bearing RF beams at the given time instance, without compromising data throughput in the wireless communications cell.

In this regard, FIG. 3 is a schematic diagram of an exemplary WCS 300 including a central unit 302 (e.g., as service node) and at least one wireless communications circuit 304 (e.g., a remote unit or a remote node) configured to reduce beamforming overhead and improve capacity and throughput based on a multi-level beam scheduling scheme. In a non-limiting example, the central unit 302 can be a service node (SN), and the wireless communications circuit 304 can be a remote node (RN) or a remote unit (RU) that provides RF coverage in a wireless communications cell 306 (e.g., an indoor small cell) in the WCS 300. The WCS 300 can include a second wireless communications circuit 308 configured to provide RF coverage in a second wireless communications cell 310. In this regard, the second wireless communications circuit 308 may also be configured to support the multi-level beam scheduling scheme. It should be appreciated that the WCS 300 can be configured to include additional wireless communications circuits to provide additional RF coverages in additional wireless communications cells. Some or all of the additional wireless communications circuits may be configured to support the multi-level beam scheduling scheme.

In examples discussed herein, the multi-level beam scheduling scheme includes three scheduling levels, namely a first level (L1) scheduler, a second level (L2) scheduler, and a third level (L3) scheduler, configured to collectively enable the multi-level beam scheduling scheme to reduce beamforming overhead and improve capacity and throughput in the WCS 300. Specifically, the L1 scheduler can be a macro-level scheduler for coordinating RF beamforming across the wireless communications cell 306 and the second wireless communications cell 310 in the WCS 300, the L2 scheduler can be a mid-level scheduler for scheduling RF beamforming in a particular wireless communications cell (e.g., the wireless communications cell 306) in the WCS 300, and the L3 scheduler can be a micro-level scheduler for scheduling different UEs to communicate via a specific RF beam in a specific wireless communications cell in the WCS 300. The L1 scheduler, which may reside in the central unit 302, is configured to enable cross-cell beam scheduling. More specifically, the L1 scheduler is configured to schedule RF beamforming across the wireless communications cell 306 and the second wireless communications cell 310 to help mitigate potential RF interferences between the wireless communications cell 306 and the second wireless communications cell 310. The L2 scheduler, which may reside in the wireless communications circuit 304 and the second wireless communications circuit 308, is configured to perform in-cell beam scheduling. In this regard, the L2 scheduler is configured to determine a respective RF beam to be formed in each of the wireless communications cell 306 and the second wireless communications cell 310 at any given time instance (e.g., a 5G-NR time slot). The L3 scheduler, which may also reside in the wireless communications circuit 304 and the second wireless communications circuit 308, is configured to perform in-beam UE scheduling. In this regard, the L3 scheduler is configured to select a UE(s) in each of the wireless communications cell 306 and the second wireless communications cell 310 to communicate with the central unit 302 via the respective RF beam formed by the L2 scheduler.

In this regard, the multi-level beam scheduling scheme differs from a conventional beam scheduling scheme, as defined in 3GPP Technical Specification (TS) 38.321, where the scheduling function is primarily performed at a medium access control (MAC) level. By employing the L1, L2, and L3 schedulers across the central unit 302 and each of the wireless communications cell 306 and the second wireless communications cell 310, as discussed in more detail below, it may be possible to reduce processing overhead and improve resource usage, data throughput, and system adaptability of the wireless communications cell 306 and the second wireless communications cell 310, thus helping to optimize capacity and throughput in the wireless communications cell 306 and the second wireless communications cell 310.

For the convenience of illustration, the multi-level beam scheduling scheme is described herein with reference to the central unit 302 and the wireless communications circuit 304 in the WCS 300 in FIG. 3. However, it should appreciated that the multi-level beam scheduling scheme discussed with reference to the central unit 302 and the wireless communications circuit 304 is generally applicable to the additional wireless communications circuits (e.g., the second wireless communications circuit 308) that may be provided in the WCS 300.

The central unit 302 may include a cell control circuit 312, which can be a field-programmable gate array (FPGA) as an example, configured to implement the L1 scheduler. The wireless communications circuit 304 may include a beam control circuit 314 and a signal control circuit 316, which can both be FPGAs as an example, configured to implement the L2 scheduler and the L3 scheduler, respectively. The wireless communications circuit 304 can include an antenna array 318, which includes a plurality of radiating elements 320(1,1)-320(M,N). The antenna array 318 is configured to form a plurality of RF beams 322(1)-322(K) to radiate an RF communications signal 324 to a plurality of UEs 326(1)-326(L) (e.g., smartphones) in the wireless communications cell 306. In a non-limiting example, a UE is a mobile equipment having an electrical circuit(s) and a radio interface(s) configured to enable user access to a wireless communications network.

The beam control circuit 314 can be configured to utilize a plurality of beam weight sets $W_{s1}$-$W_{sK}$ to cause the antenna array 318 to form the RF beams 322(1)-322(K), respectively. Notably, the beam weight sets $W_{s1}$-$W_{sK}$ for forming a particular RF beam among the RF beams 322(1)-322(K) in a particular transmission time interval (TTI) may already exist. In this regard, the beam control circuit 314 can be configured to retrieve the existing beam weight sets $W_{s1}$-$W_{sK}$ to cause the antenna array 318 to form the particular RF beam. Each of the beam weight sets $W_{s1}$-$W_{sK}$ includes a plurality of beam weights $w_{1,1}$-$w_{M,N}$ that correspond respectively to the radiating elements 320(1,1)-320(M,N). The wireless communications circuit 304 includes a beamformer circuit 328 configured to generate a plurality of weighted RF communications signals 330(1,1)-330(M,N) based on the RF communications signal 324 and the beam weights $w_{1,1}$-$w_{M,N}$ in each of beam weight sets $W_{s1}$-$W_{sK}$ to cause the antenna array 318 to form the RF beams 322(1)-322(K). According to previous discussions in FIGS. 2A and 2B, the beam control circuit 314 may control how each of the RF beams 322(1)-322(K) is formed by determining appropriate amplitude terms and phase terms for each of the beam weight sets $W_{s1}$-$W_{sK}$.

In a non-limiting example, the antenna array 318 can be configured to form the RF beams 322(1)-322(K) in a plurality of time slots 332(1)-332(K), respectively. Each of the time slots 332(1)-332(K) may be a 5G-NR time slot as defined 3GPP standards. The specific length of time slots 332(1)-332(K) may depend on a specific numerology determined for communicating the RF communications signal 324 in the WCS 300.

The beam control circuit 314, which implements the L2 scheduler, may be configured to determine at least one selected RF beam b* among the RF beams 322(1)-322(K) to be formed in a selected time slot t* among the time slots 332(1)-332(K). For the convenience of illustration, the RF beams 322(1) and the time slot 332(1) are referenced hereinafter as non-limiting examples of the selected RF beam b* and the selected time slot t*. Accordingly, the beam control circuit 314 may generate the beam weights $w_{1,1}$-$w_{M,N}$ in the beam weight set $W_{s1}$ to cause the antenna array 318 to form the selected RF beam 322(1) in the selected time slot 332(1).

Although the antenna array 318 may be configured to form the RF beams 322(1)-322(K) to provide RF coverage to the UEs 326(1)-326(L) in the wireless communications cell 306, only one or more UEs among the UEs 326(1)-326(L), for example the UEs 326(1) and 326(2), may have identified the selected RF beam 322(1) as the strongest RF beam based on the reference beams 218(1)-218(N) as previously discussed in FIG. 2A. As such, when the beam control circuit 314 selects the RF beam 322(1) to be formed in the selected time slot 332(1), only the UEs 326(1) and 326(2) need to be scheduled to communicate the RF communications signal 324 via the selected RF beam 322(1). In this regard, the signal control circuit 316 may be configured to schedule the UEs 326(1) and 326(2) to communicate the RF communications signal 324 via the selected RF beam 322(1).

Figure 4:
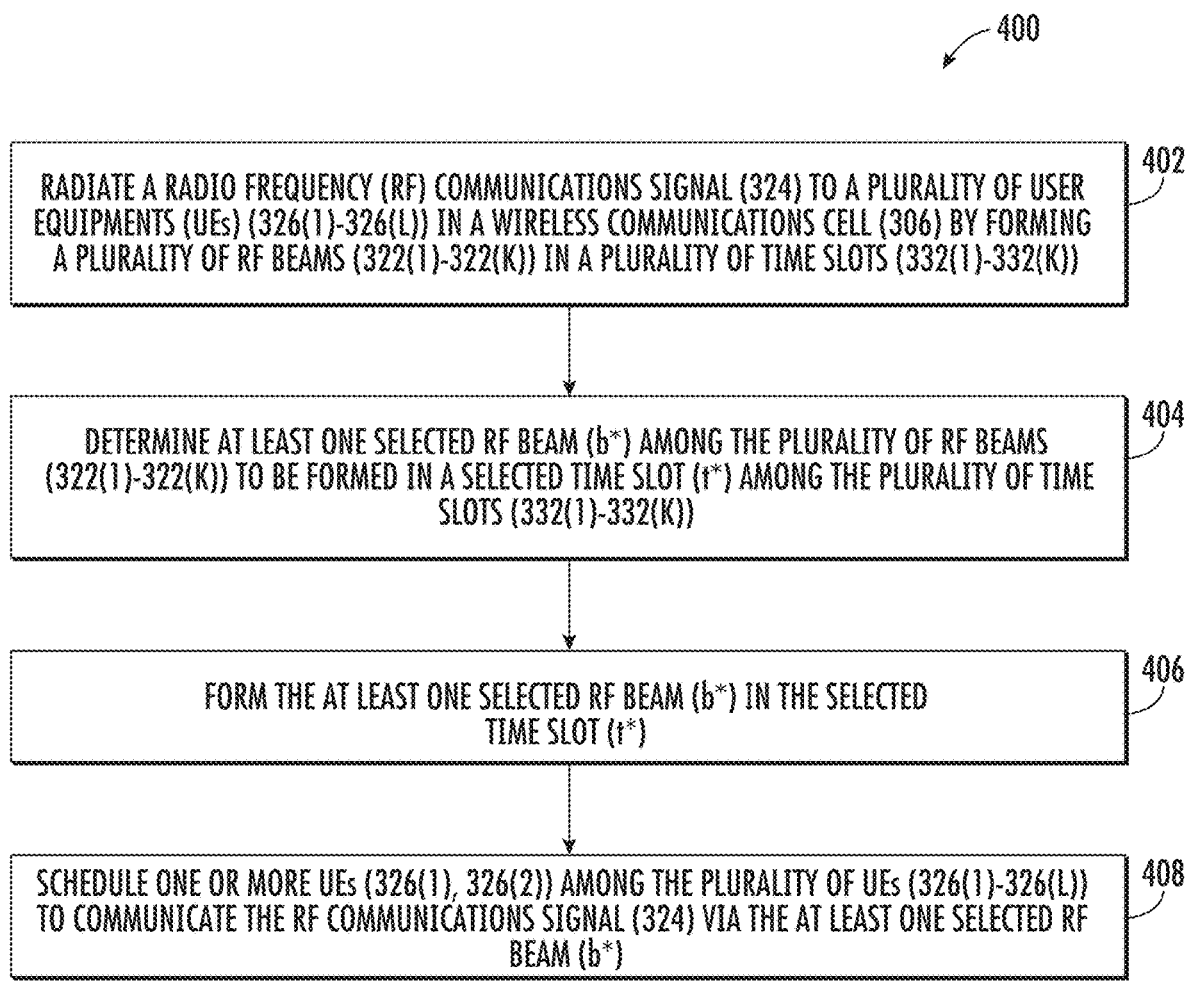
FIG. 4 is a flowchart of an exemplary process that may be employed in the WCS of FIG. 3 to reduce beamforming overhead and improve capacity and throughput based on the multi-level beam scheduling scheme.

The WCS 300 may be configured to perform the multi-level beam scheduling scheme based on a process. In this regard, FIG. 4 is a flowchart of an exemplary process 400 that may be employed in the WCS 300 of FIG. 3 to reduce beamforming overhead and improve capacity and throughput based on the multi-level beam scheduling scheme.

According to the process 400, the antenna array 318 is configured to radiate the RF communications signal 324 to the UEs 326(1)-326(L) in the wireless communications cell 306 by forming the RF beams 322(1)-322(K) in the time slots 332(1)-332(K) (block 402). The beam control circuit 314 is configured to determine the selected RF beam b* among the RF beams 322(1)-322(K) to be formed in the selected time slot t* among the time slots 332(1)-332(K) (block 404). The beam control circuit 314 is further configured to cause the antenna array 318 to form the selected RF beam b* in the selected time slot t* (block 406). The signal control circuit 316 is configured to schedule the UEs 326(1) and 326(2) among the UEs 326(1)-326(L) to communicate the RF communications signal 324 via the selected RF beam b* (block 408).

With reference back to FIG. 3, in a non-limiting example, the wireless communications circuit 304 and the central unit 302 may be configured to carry out different networking functions. For example, the wireless communications circuit 304 can be configured to implement such lower layer networking protocols as physical (PHY), medium access control (MAC), and radio link control (RLC) protocols. The central unit 302, on the other hand, may be configured to implement such higher layer networking protocols as packet data convergence protocol (PDCP), radio resource management (RRC), higher-layer (L3+) protocols such as transport control protocol (TCP) and internet protocol (IP), and self-organizing network (SON) protocols. As such, the cell control circuit 312, the beam control circuit 314, and the signal control circuit 316 can communicate across the central unit 302 and the wireless communications circuit 304 by means of appropriate networking protocols to perform the multi-level beam scheduling in the WCS 300.

The cell control circuit 312 may be configured to have a full knowledge of all the RF beams to be formed and all the UEs to be serviced in each of the wireless communications cells in the WCS 300 to carry out the cross-cell beam scheduling in the WCS 300. In this regard, the cell control circuit 312 is aware of the RF beams 322(1)-322(K) and the UEs 326(1)-326(L) in the wireless communications cell 306. The cell control circuit 312 may be configured to rank the RF beams 322(1)-322(K) to generate a beam priority list. In a non-limiting example, the cell control circuit 312 ranks the RF beams 322(1)-322(K) in the beam priority list by associating a plurality of priority weights $PW_1$-$PW_K$ to the RF beams 322(1)-322(K), respectively. Each of the priority weights $PW_1$-$PW_K$ may correspond to an integer value indicative of relative importance among the RF beams 322(1)-322(K). In a non-limiting example, each of the priority weights $PW_1$-$PW_K$ can be between one (1) and ten (10), wherein 10 represents the highest priority weight and 1 represents the lowest priority weight. For example, the cell control circuit 312 can generate the priority weights $PW_1$-$PW_K$ as $\{(PW_1=10), (PW_2=8), (PW_3=9), (PW_4=1), \ldots, (PW_K=1)\}$ to indicate that the RF beam 322(1) is the highest prioritized RF beam among the RF beams 322(1)-322(K), the RF beam 322(3) is the second highest prioritized RF beam among the RF beams 322(1)-322(K), the RF beam 322(2) is the third highest prioritized RF beam among the 322(1)-322(K), and RF beams 322(4)-322(K) are the lowest prioritized RF beams among the RF beams 322(1)-322(K). In another example, the cell control circuit 312 can generate the priority weights $PW_1$-$PW_K$ as $\{(PW_1=1), (PW_2=1), (PW_3=1), (PW_4=1), (PW_K=1)\}$ to indicate that the cell control circuit 312 is indifferent to the RF beams 322(1)-322(K).

Accordingly, the cell control circuit 312 may generate a beam priority indication signal 334 including the priority weights $PW_1$-$PW_K$ corresponding to the RF beams 322(1)-322(K) and provide the beam priority indication signal 334 to the beam control circuit 314. The beam priority indication signal 334 may indicate one or more prioritized RF beams among the RF beams 322(1)-322(K). In the above example that the cell control circuit 312 generates the priority weights $PW_1$-$PW_K$ as $\{(PW_1=10), (PW_2=8), (PW_3=9), (PW_4=1), (PW_K=1)\}$, the beam priority indication signal 334 may be generated to only include one or more top priority weights, which can be one or more selected priority weights among the priority weights $PW_1$-$PW_K$ that are higher than a priority weight threshold. For example, if the priority weight threshold equals 7, then the higher priority weights $\{(PW_1=10), (PW_2=8), (PW_3=9)\}$ will be the top priority weights among the priority weights $PW_1$-$PW_K$ to indicate the RF beams 322(1)-322(3) as the prioritized RF beams among the RF beams 322(1)-322(K). In this regard, the beam priority indication signal 334 may be generally said to provide the beam priority indication signal 334 having one or more top priority weights $\{PW_1, PW_2, \ldots, PW_J\}$ ($J \leq K$) that correspond to one or more prioritized RF beams among the RF beams 322(1)-322(K).

Notably, the top priority weights $PW_1$-$PW_J$ provided in the beam priority indication signal 334 may serve merely as a recommendation, as opposed to a mandate, to the beam control circuit 314. In this regard, the beam control circuit 314 may perform the in-cell beam scheduling in accordance to the top priority weights $PW_1$-$PW_J$ or independent of the top priority weights $PW_1$-$PW_J$.

The beam control circuit 314 and the signal control circuit 316 may be configured to have a full knowledge of all the UEs 326(1)-326(L) to be served in the wireless communications cell 306. Accordingly, the beam control circuit 314 can be configured to perform the in-cell beam scheduling to determine the selected RF beam b* (e.g., the RF beam 322(1)) among the RF beams 322(1)-322(K) to be radiated in the selected time slot t* (e.g., the time slot 332(1)) among the time slots 332(1)-332(K). The beam control circuit 314 may be configured to communicate the selected RF beam b* and the selected time slot t* to the signal control circuit 316.

For example, the signal control circuit 316 can be configured to perform the in-beam UE scheduling based on a proportional fair scheduler, which is a compromise-based scheduling algorithm that is based upon maintaining a balance between maximizing total throughput of the WCS 300 and guaranteeing each of the UEs 326(1)-326(L) in the wireless communications cell 306 a minimal level of service. In a non-limiting example, each of the RF beams 322(1)-322(K) in the wireless communications cell 306 is associated with UEs $\{u^1, u^2, \ldots, u^I\}$ (I≤L) and corresponds to a proportional metric $\{PF_{u1}, PF_{u2}, \ldots, PF_{uI}\}$, which is a function that defines the achievable throughput by each of the RF beams 322(1)-322(K) for each pair of the UEs $\{u^1, u^2, \ldots, u^I\}$ associated with the respective RF beam.

The beam control circuit 314 may generate a plurality of summed utilities $U_1$-$U_K$ for the RF beams 322(1)-322(K), respectively. Each of the summed utilities $U_1$-$U_K$ is a sum of the proportional metric $\{PF_{u1}, PF_{u2}, \ldots, PF_{uI}\}$ corresponding to the UEs $\{u^1, u^2, \ldots, u^I\}$ associated with the respective RF beam. Specifically, the beam control circuit 314 can generate each of the summed utilities $U_1$-$U_K$ based on the equation (Eq. 5) below.

$$U_i = \Sigma_{i=1}^{K} PF_{ui} \qquad \text{(Eq. 5)}$$

Accordingly, the beam control circuit 314 may determine the selected RF beam b* to be the RF beam among the RF beams 322(1)-322(K) that corresponds to a maximum summed utility among the summed utilities $U_1$-$U_K$. For example, the beam control circuit 314 will determine the RF beam 322(1) as the selected RF beam b* if the summed utility $U_1$ is the maximum summed utility among the summed utilities $U_1$-$U_K$.

Notably, the selected RF beam b* can have a fair chance of being detected as a strongest RF beam by a number of the UEs 326(1)-326(L) for communicating the RF communications signal 324 in the wireless communications cell 306. For example, as illustrated in FIG. 3, the selected RF beam 322(1) may have been detected by the UEs 326(1) and 326(2) as the strongest RF beam among the RF beams 322(1)-322(K). In this regard, the signal control circuit 316 may be configured to perform the in-beam UE scheduling to schedule the UEs 326(1) and 326(2) to communicate the RF communications signal 324 via the selected RF beam b* in the selected time slot t*. The signal control circuit 316 may schedule the UEs 326(1) and 326(2) based on any UE scheduler, including but not limited to a proportional fair scheduler, a round robin scheduler, and a quality-of-service (QoS) based scheduler.

As mentioned earlier, the beam control circuit 314 may take into consideration the top priority weights $\{PW_1, PW_2, PW_J\}$, as provided by the cell control circuit 312 in the central unit 302, when determining the selected RF beam b*. In this regard, the beam control circuit 314 may determine the selected RF beam b* based on the equation (Eq. 6) below.

$$b^* = \text{Max}(PW_i \cdot U_{max})(1 \leq i \leq J) \qquad \text{(Eq. 6)}$$

In the equation (Eq. 6) above, $U_{max}$ represents a maximum summed utility among the summed utilities $U_1$-$U_K$. In case the beam control circuit 314 decides not to take the top priority weights $\{PW_1, PW_2, \ldots, PW_J\}$ into consideration, the beam control circuit 314 may simply determine an RF beam corresponding to the maximum summed utility $U_{max}$ as the selected RF beam b*.

The cell control circuit 312 may be configured to generate the top priority weights $\{PW_1, PW_2, PW_J\}$ and provide the beam priority indication signal 334 based on a faster time scale or a slower time scale, as described next with reference to FIGS. 5A and 5B. Common elements between FIGS. 3, 5A, and 5B are shown therein with common element numbers and will not be re-described herein.

Figure 5A:
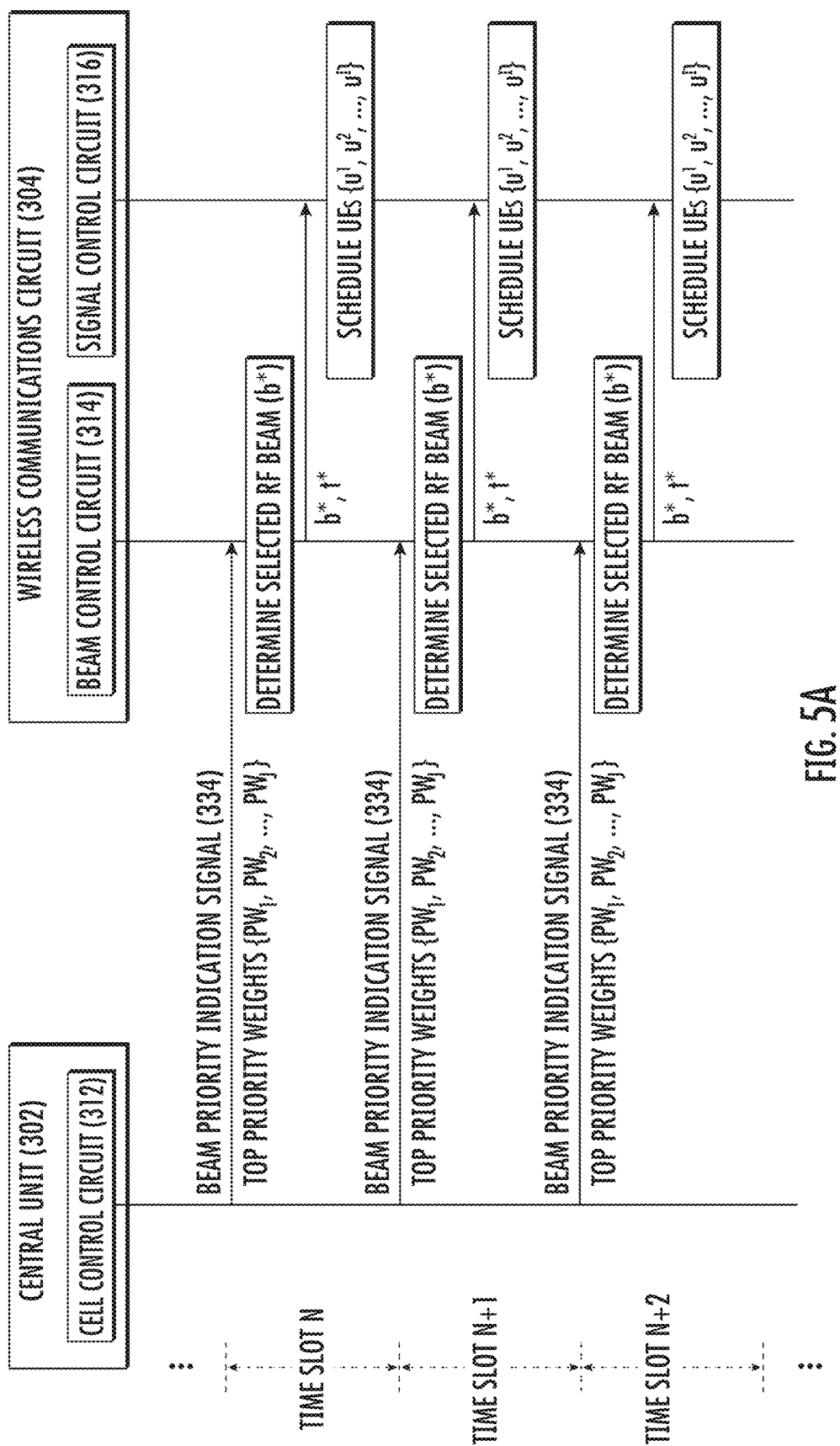
FIG. 5A is a flow diagram providing an exemplary illustration of the central unit in FIG. 3 configured to provide a beam priority indication signal to the at least one wireless communications circuit based on a faster time scale.

FIG. 5A is a flow diagram providing an exemplary illustration of the central unit 302 in FIG. 3 configured to provide the beam priority indication signal 334 to the wireless communications circuit 304 based on a faster time scale. In this regard, the cell control circuit 312 is configured to generate the top priority weights $\{PW_1, PW_2, PW_J\}$ and provide the top priority weights $\{PW_1, PW_2, PW_J\}$ in the beam priority indication signal 334 on a per-time-slot basis. As illustrated in FIG. 5A, in each time slot, the cell control circuit 312 provides the beam priority indication signal 334 to the beam control circuit 314. The beam control circuit 314 determines the selected RF beam b* and communicates the selected RF beam b* and the selected time slot t* to the signal control circuit 316. Accordingly, the signal control circuit 316 schedules the UEs $\{u^1, u^2, \ldots, u^I\}$ to communicate the RF communications signal 324 via the selected RF beam b*.

Figure 5B:
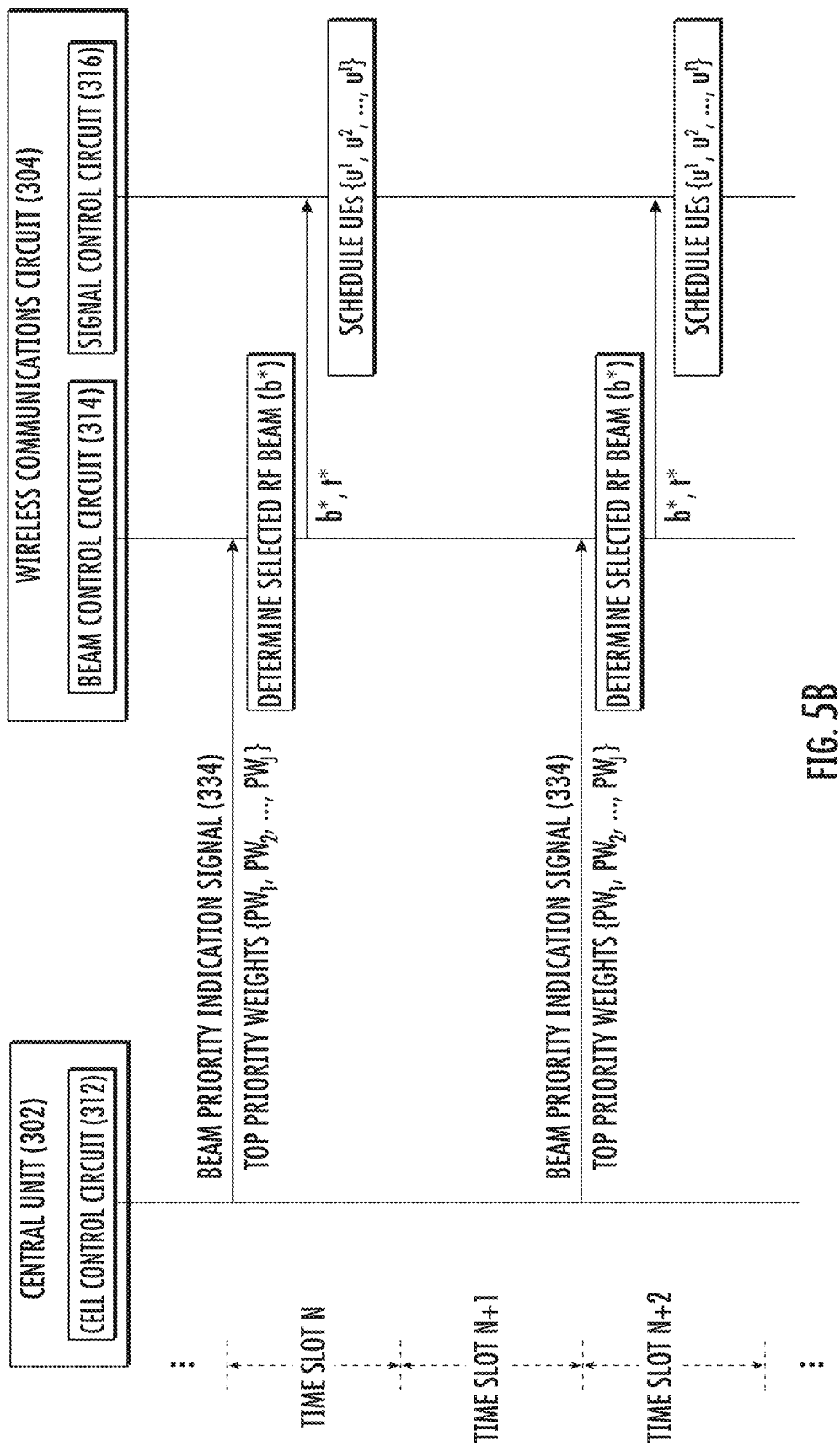
FIG. 5B is a flow diagram providing an exemplary illustration of the central unit in FIG. 3 configured to provide a beam priority indication signal to the at least one wireless communications circuit based on a slower time scale.

FIG. 5B is a flow diagram providing an exemplary illustration of the central unit 302 in FIG. 3 configured to provide the beam priority indication signal 334 to the wireless communications circuit 304 based on a slower time scale. In this regard, the cell control circuit 312 is configured to generate the top priority weights $\{PW_1, PW_2, \ldots, PW_J\}$ and provide the top priority weights $\{PW_1, PW_2, \ldots, PW_J\}$ in the beam priority indication signal 334 in at least every two time slots. As illustrated in FIG. 5B, the cell control circuit 312 provides the beam priority indication signal 334 to the beam control circuit 314 in time slots N and N+2, but not in time slot N+1. In this regard, during time slot N+1, the beam control circuit 314 will determine the selected RF beam b* based on the top priority weights $\{PW_1, PW_2, \ldots, PW_J\}$ received in time slot N. In a non-limiting example, the cell control circuit 312 is configured to generate the top priority weights $\{PW_1, PW_2, \ldots, PW_J\}$ and provide the top priority weights $\{PW_1, PW_2, \ldots, PW_J\}$ in the beam priority indication signal 334 in every ten (10) time slots.

As described earlier in FIG. 3, the cell control circuit 312 may be configured to have a full knowledge of all the RF beams to be formed and all the UEs to be serviced in each of the wireless communications cells in the WCS 300. As such, the cell control circuit 312 may generate the respective top priority weights $\{PW_1, PW_2, \ldots, PW_J\}$ for a pair of neighboring wireless communications cells, such as the wireless communications cell 306 and the second wireless communications cell 310 in FIG. 3, to help mitigate interference between the neighboring wireless communications cells.

Figure 6A:
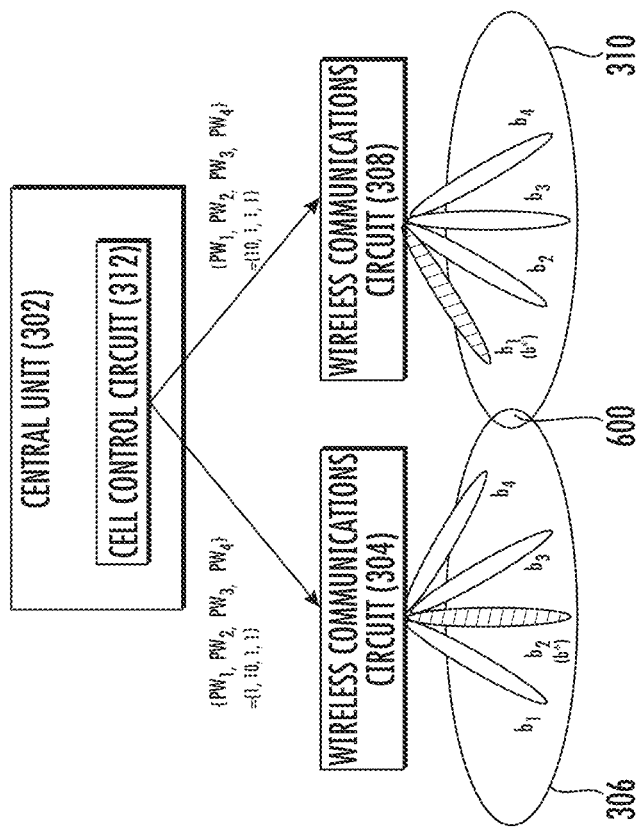
FIGS. 6A and 6B are schematic diagrams providing exemplary illustrations of the WCS of FIG. 3 configured to mitigate interferences between a pair of wireless communications cells.
Figure 6B:
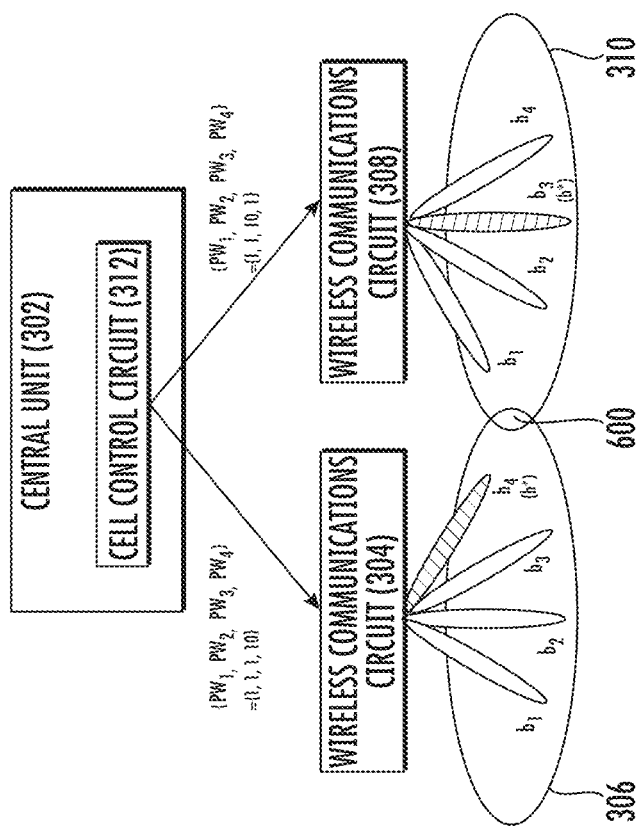

In this regard, FIGS. 6A and 6B are schematic diagrams providing exemplary illustrations of the WCS 300 of FIG. 3 configured to mitigate interferences between the wireless communications cell 306 and the second wireless communications cell 310. Common elements between FIGS. 3, 6A, and 6B are shown therein with common element numbers and will not be re-described herein.

With reference to FIG. 6A, in a non-limiting example, the wireless communications circuit 304 is configured to radiate RF beams $b_1$, $b_2$, $b_3$, and $b_4$ in the wireless communications cell 306. Likewise, the second wireless communications circuit 308 is configured to radiate RF beams $b_1$, $b_2$, $b_3$, and $b_4$ in the second wireless communications cell 310. Notably, the wireless communications cell 306 may be partially overlapping with the second wireless communications cell 310 in an area 600. As such, a potential interference may result if the wireless communications circuit 304 determines the RF beam $b_4$ as the selected RF beam $b^*$ to be radiated in the wireless communications cell 306 in the selected time slot $t^*$, while the second wireless communications circuit 308 determines the RF beam $b_1$ as the selected RF beam $b^*$ to be radiated in the second wireless communications cell 310 in the selected time slot $t^*$. In this regard, the cell control circuit 312 in the central unit 302 may perform the cross-cell beam scheduling to help mitigate the potential interference between the wireless communications cell 306 and the second wireless communications cell 310.

In a non-limiting example, the cell control circuit 312 may provide a first set of the top priority weights $\{PW_1, PW_2, PW_3, PW_4\} = \{1, 1, 1, 10\}$ and a second set of the top priority weights $\{PW_1, PW_2, PW_3, PW_4\} = \{1, 1, 10, 1\}$ to the wireless communications circuit 304 and the second wireless communications circuit 308, respectively. The first set of the top priority weights $\{PW_1, PW_2, PW_3, PW_4\} = \{1, 1, 1, 10\}$ causes the wireless communications circuit 304 to determine the RF beam $b_4$ as the selected RF beam $b^*$ to be radiated in the wireless communications cell 306 in the selected time slot $t^*$. The second set of the top priority weights $\{PW_1, PW_2, PW_3, PW_4\} = \{1, 1, 10, 1\}$ causes the second wireless communications circuit 308 to determine the RF beam $b_3$ as the selected RF beam $b^*$ to be radiated in the second wireless communications cell 310 in the selected time slot $t^*$. As a result, it may be possible to mitigate or even eliminate the potential interference between the wireless communications cell 306 and the second wireless communications cell 310.

With reference to FIG. 6B, the cell control circuit 312 may provide a first set of the top priority weights $\{PW_1, PW_2, PW_3, PW_4\} = \{1, 10, 1, 1\}$ and a second set of the top priority weights $\{PW_1, PW_2, PW_3, PW_4\} = \{10, 1, 1, 1\}$ to the wireless communications circuit 304 and the second wireless communications circuit 308, respectively. The first set of the top priority weights $\{PW_1, PW_2, PW_3, PW_4\} = \{1, 10, 1, 1\}$ causes the wireless communications circuit 304 to determine the RF beam $b_2$ as the selected RF beam $b^*$ to be radiated in the wireless communications cell 306 in the selected time slot $t^*$. The second set of the top priority weights $\{PW_1, PW_2, PW_3, PW_4\} = \{10, 1, 1, 1\}$ causes the second wireless communications circuit 308 to determine the RF beam $b_1$ as the selected RF beam $b^*$ to be radiated in the second wireless communications cell 310 in the selected time slot $t^*$. As a result, it may be possible to mitigate or even eliminate the potential interference between the wireless communications cell 306 and the second wireless communications cell 310.

Figure 7:
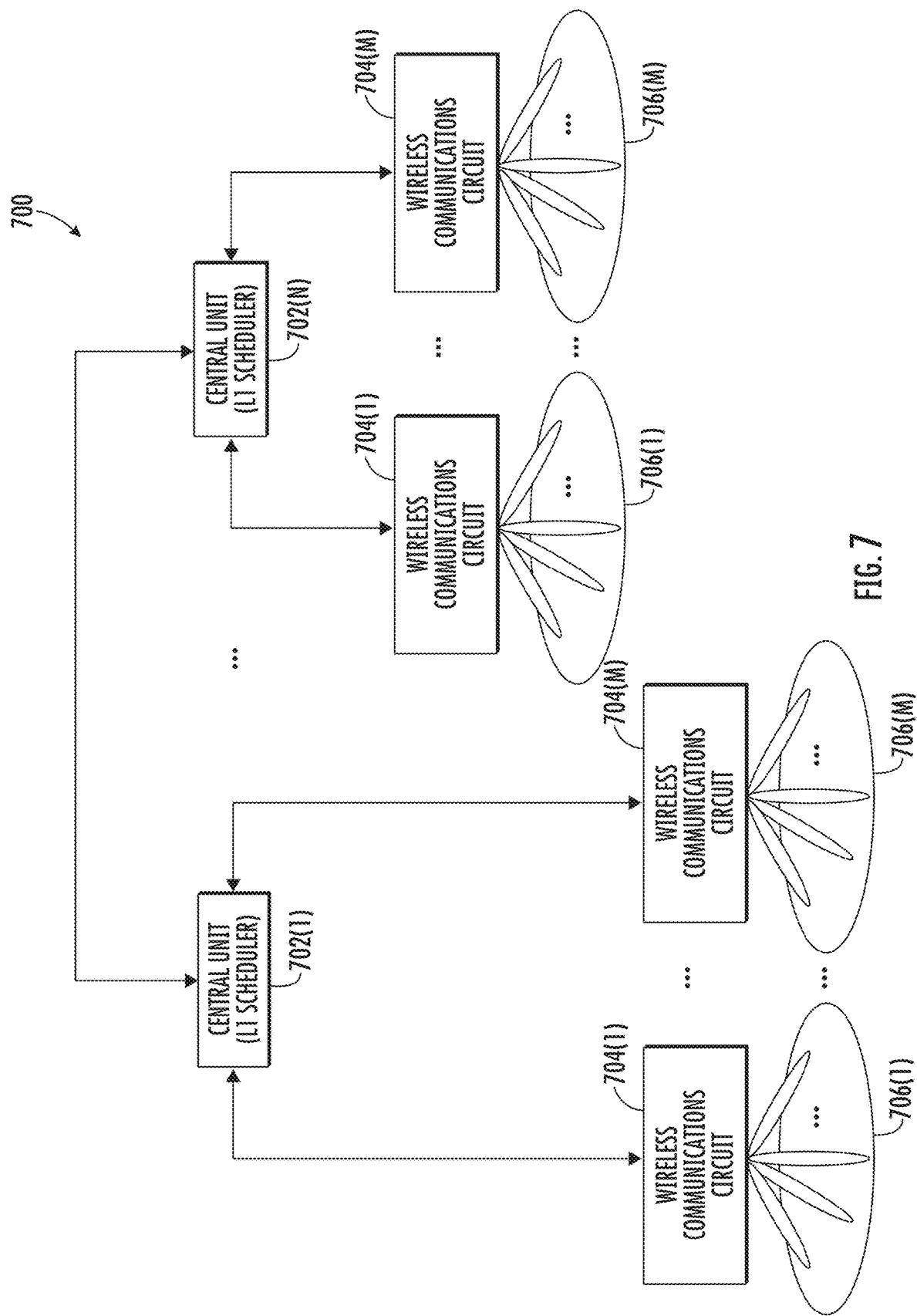
FIG. 7 is a schematic diagram of a WCS including a plurality of distributed central units configured to provide RF coverage in a larger number of wireless communications cells.

The WCS 300 of FIG. 3 can be scaled to provide RF coverage in a larger number of wireless communications cells. In this regard, FIG. 7 is a schematic diagram of a WCS 700 including a plurality of distributed central units 702(1)-702(N) configured to provide RF coverage in a larger number of wireless communications cells.

Each of the distributed central units 702(1)-702(N) is coupled to a plurality of wireless communications circuits 704(1)-704(M) configured to provide RF coverage in a plurality of wireless communications cells 706(1)-706(M), respectively. Each of the distributed central units 702(1)-702(N) is configured according to the central unit 302 in FIG. 3 to perform the in-cell beam scheduling. Likewise, each of the wireless communications circuits 704(1)-704(M) is configured according to the wireless communications circuit 304 in FIG. 3 to perform the in-cell beam scheduling and the in-beam UE scheduling. In a non-limiting example, the distributed central units 702(1)-702(N) can communicate with each other to coordinate the cross-cell beam scheduling.

Figure 8:
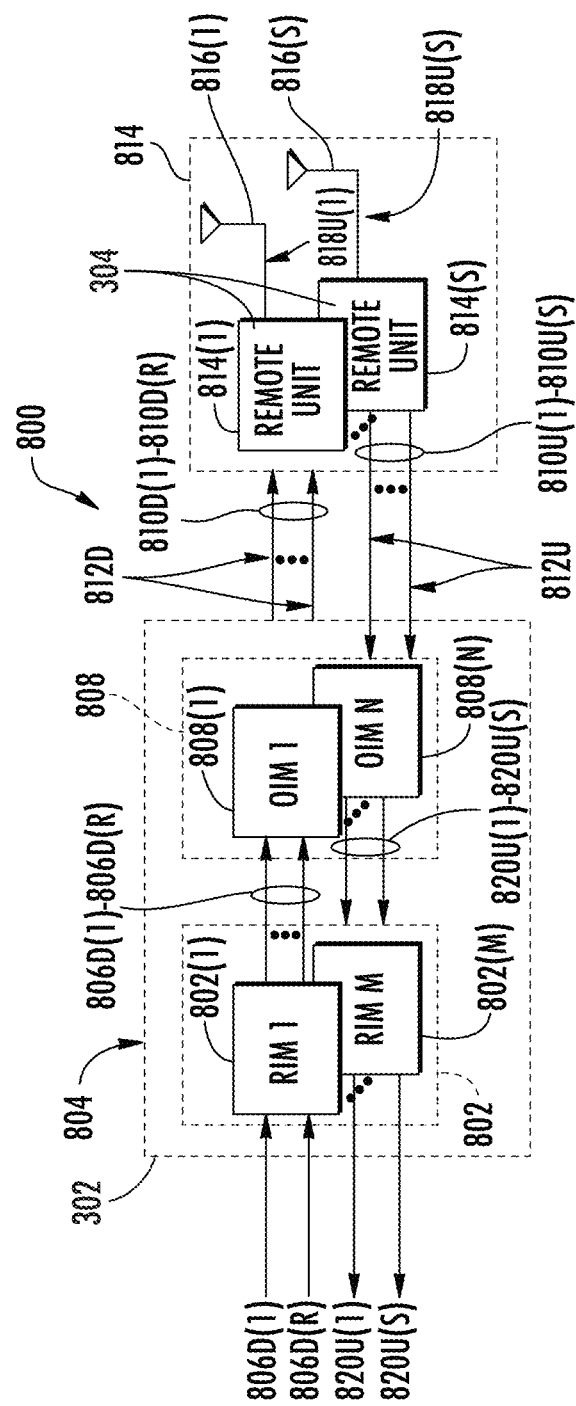
FIG. 8 is a schematic diagram of an exemplary WCS provided in the form of an optical fiber-based DAS that is configured to include the wireless communications circuit of FIG. 3 to enable the multi-level beam scheduling scheme.

FIG. 8 is a schematic diagram an exemplary WCS 800 provided in the form of an optical fiber-based WDS that can include a central unit, such as the central unit 302 in FIG. 3 to perform cross-cell beam scheduling, and a plurality of remote units, such as the wireless communications circuit 304 in FIG. 3 to perform the in-cell beam scheduling and the in-beam UE scheduling in the wireless communications cell 306. The WCS 800 includes an optical fiber for distributing communications services for multiple frequency bands. The WCS 800 in this example is comprised of three (3) main components. A plurality of radio interfaces provided in the form of radio interface modules (RIMs) 802(1)-802(M) are provided in a central unit 804 to receive and process a plurality of downlink digital communications signals 806D(1)-806D(R) prior to optical conversion into downlink optical fiber-based communications signals. The central unit 804 may be configured according to the central unit 302 in FIG. 3 to perform cross-cell beam scheduling. The downlink digital communications signals 806D(1)-806D(R) may be received from a base station or a baseband unit as an example. The RIMs 802(1)-802(M) provide both downlink and uplink interfaces for signal processing. The notations "1-R" and "1-M" indicate that any number of the referenced component, 1-R and 1-M, respectively, may be provided. The central unit 804 is configured to accept the RIMs 802(1)-802(M) as modular components that can easily be installed and removed or replaced in the central unit 804. In one example, the central unit 804 is configured to support up to twelve (12) RIMs 802(1)-802(12). Each of the RIMs 802(1)-802(M) can be designed to support a particular type of radio source or range of radio sources (i.e., frequencies) to provide flexibility in configuring the central unit 804 and the WCS 800 to support the desired radio sources.

For example, one RIM 802 may be configured to support the Personalized Communications System (PCS) radio band. Another RIM 802 may be configured to support the 800 megahertz (MHz) radio band. In this example, by inclusion of the RIMs 802(1)-802(M), the central unit 804 could be configured to support and distribute communications signals on both PCS and Long-Term Evolution (LTE) 700 radio bands, as an example. The RIMs 802(1)-802(M) may be provided in the central unit 804 that support any frequency bands desired, including, but not limited to, the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 802(1)-802(M) may also be provided in the central unit 804 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 802(1)-802(M) may be provided in the central unit 804 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 8, the downlink digital communications signals 806D(1)-806D(R) are provided to a plurality of optical interfaces provided in the form of optical interface modules (OIMs) 808(1)-808(N) in this embodiment to convert the downlink digital communications signals 806D(1)-806D(R) into a plurality of downlink optical fiber-based communications signals 810D(1)-810D(R). The notation "1-N" indicates that any number of the referenced component 1-N may be provided. The OIMs 808(1)-808(N) may be configured to provide a plurality of optical interface components (OICs) that contain optical-to-electrical (O/E) and electrical-to-optical (E/O) converters, as will be described in more detail below. The OIMs 808(1)-808(N) support the radio bands that can be provided by the RIMs 802(1)-802(M), including the examples previously described above.

The OIMs 808(1)-808(N) each include E/O converters to convert the downlink digital communications signals 806D(1)-806D(R) into the downlink optical fiber-based communications signals 810D(1)-810D(R). The downlink optical fiber-based communications signals 810D(1)-810D(R) are communicated over a downlink optical fiber-based communications medium 812D to a plurality of remote units 814(1)-814(S). At least one selected remote unit among the remote units 814(1)-814(S) can be configured according to the wireless communications circuit 304 of FIG. 3 to perform in-cell beam scheduling and the in-beam UE scheduling. The notation "1-S" indicates that any number of the referenced component 1-S may be provided. Remote unit O/E converters provided in the remote units 814(1)-814(S) convert the downlink optical fiber-based communications signals 810D(1)-810D(R) back into the downlink digital communications signals 806D(1)-806D(R), which are then converted into a plurality of downlink RF communications signals and provided to antennas 816(1)-816(S) in the remote units 814(1)-814(S) to client devices in the reception range of the antennas 816(1)-816(S).

The remote units 814(1)-814(S) receive a plurality of uplink RF communications signals from the client devices through the antennas 816(1)-816(S). The remote units 814(1)-814(S) convert the uplink RF communications signals into a plurality of uplink digital communications signals 818U(1)-818U(S). Remote unit E/O converters are also provided in the remote units 814(1)-814(S) to convert the uplink digital communications signals 818U(1)-818U(S) into a plurality of uplink optical fiber-based communications signals 810U(1)-810U(S). The remote units 814(1)-814(S) communicate the uplink optical fiber-based communications signals 810U(1)-810U(S) over an uplink optical fiber-based communications medium 812U to the OIMs 808(1)-808(N) in the central unit 804. The OIMs 808(1)-808(N) include O/E converters that convert the received uplink optical fiber-based communications signals 810U(1)-810U(S) into a plurality of uplink digital communications signals 820U(1)-820U(S), which are processed by the RIMs 802(1)-802(M) and provided as the uplink digital communications signals 820U(1)-820U(S). The central unit 804 may provide the uplink digital communications signals 820U(1)-820U(S) to a base station or other communications system.

Note that the downlink optical fiber-based communications medium 812D and the uplink optical fiber-based communications medium 812U connected to each of the remote units 814(1)-814(S) may be a common optical fiber-based communications medium, wherein for example, wave division multiplexing (WDM) is employed to provide the downlink optical fiber-based communications signals 810D(1)-810D(R) and the uplink optical fiber-based communications signals 810U(1)-810U(S) on the same optical fiber-based communications medium.

Figure 9:
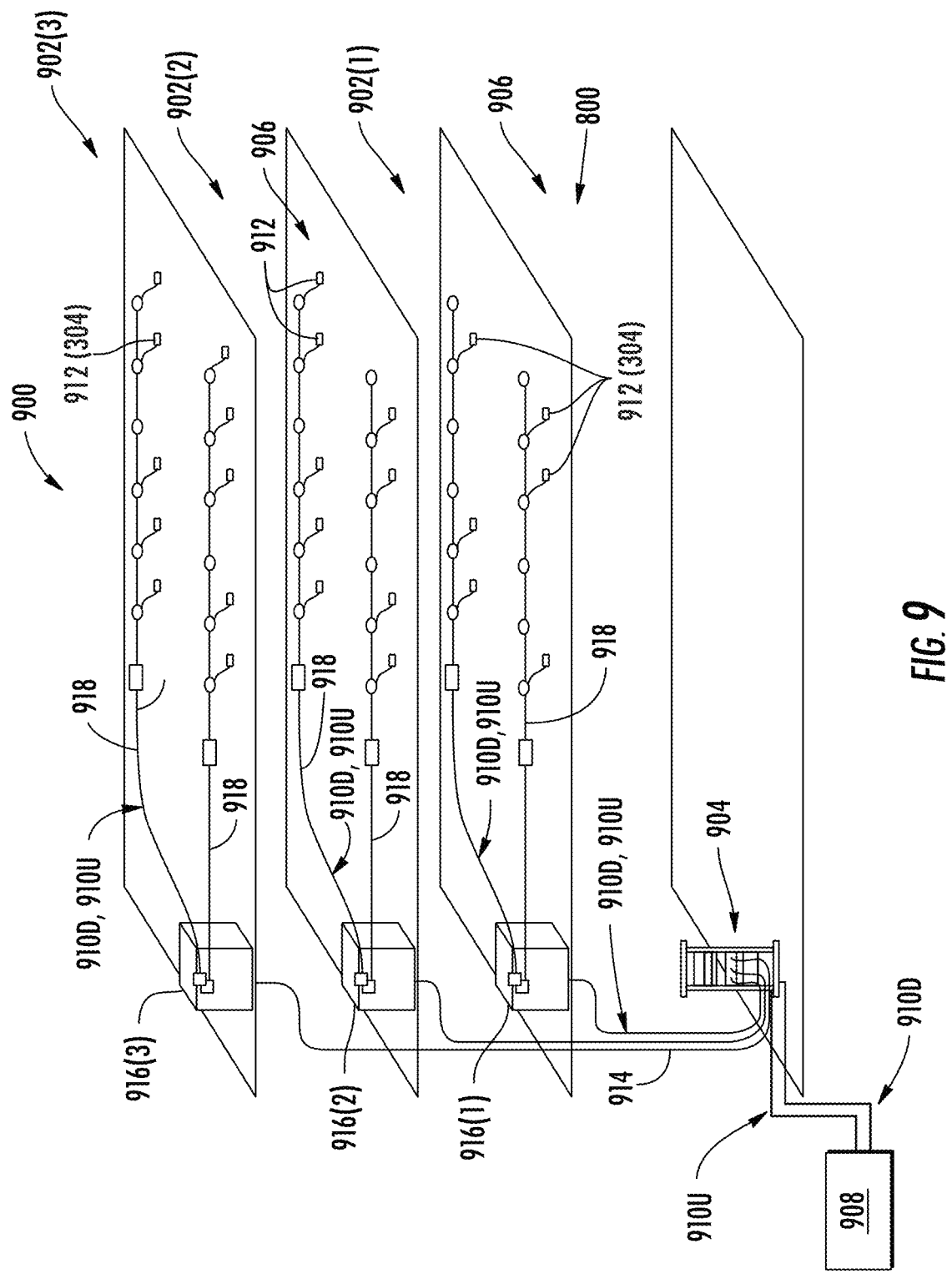
FIG. 9 is a schematic diagram of an exemplary building infrastructure with a deployed DCS, such as the optical fiber-based DAS in FIG. 8.

The WCS 800 in FIG. 8 can be provided in an indoor environment as illustrated in FIG. 9. FIG. 9 is a partial schematic cut-away diagram of an exemplary building infrastructure 900 incorporating the WCS 800 of FIG. 8. The building infrastructure 900 in this embodiment includes a first (ground) floor 902(1), a second floor 902(2), and a third floor 902(3). The floors 902(1)-902(3) are serviced by a central unit 904 to provide antenna coverage areas 906 in the building infrastructure 900. The central unit 904 is communicatively coupled to a base station 908 to receive downlink communications signals 910D from the base station 908. The central unit 904 is communicatively coupled to a plurality of remote units 912 to distribute the downlink communications signals 910D to the remote units 912 and to receive uplink communications signals 910U from the remote units 912, as previously discussed above. In a non-limiting example, any of the remote units 912 can be configured to incorporate the wireless communications circuit 304 of FIG. 3 to perform the in-cell beam scheduling and the in-beam UE scheduling in the wireless communications cell 306. The downlink communications signals 910D and the uplink communications signals 910U communicated between the central unit 904 and the remote units 912 are carried over a riser cable 914. The riser cable 914 may be routed through interconnect units (ICUs) 916(1)-916(3) dedicated to each of the floors 902(1)-902(3) that route the downlink communications signals 910D and the uplink communications signals 910U to the remote units 912 and also provide power to the remote units 912 via array cables 918.

Figure 10:
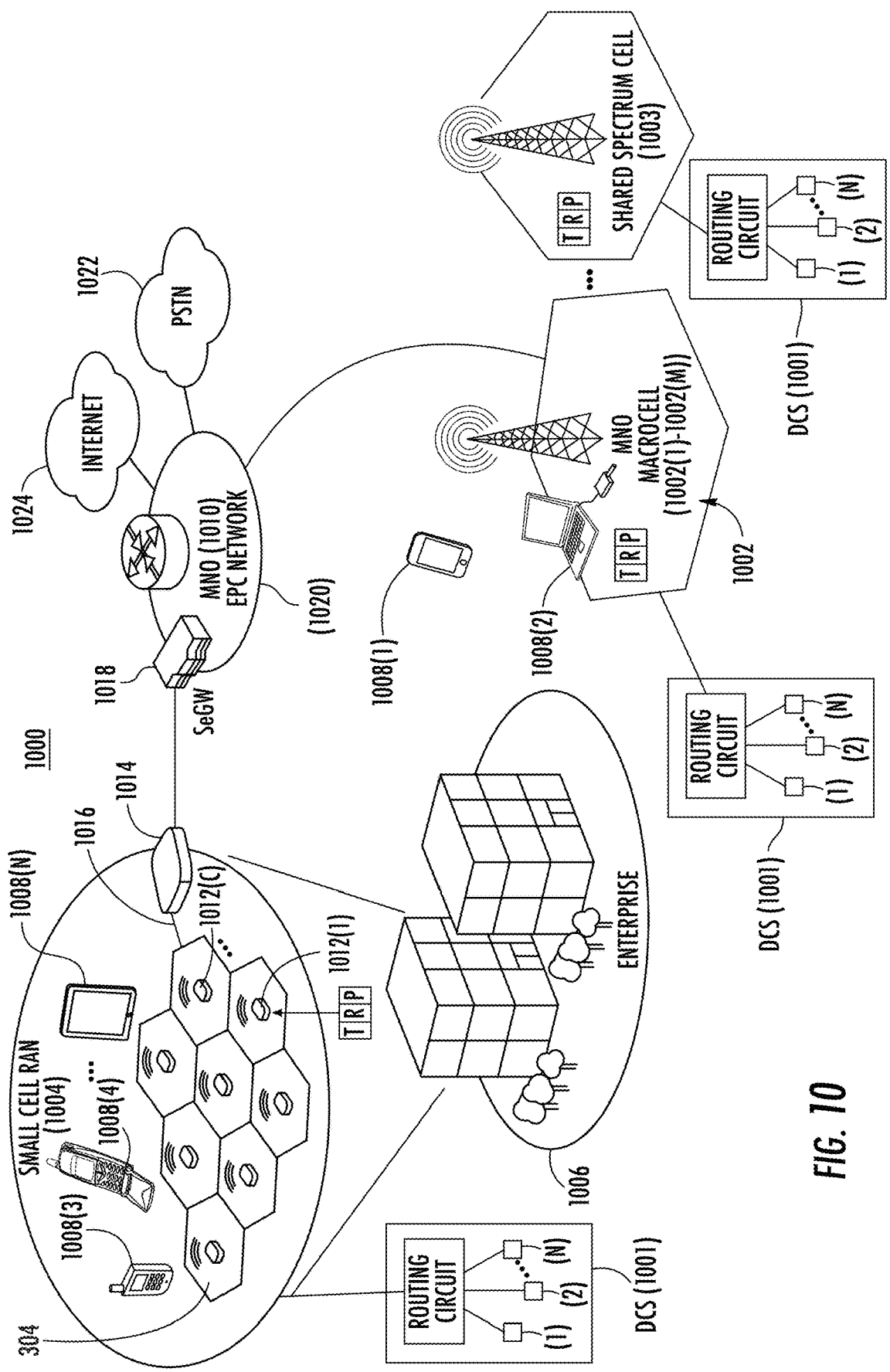
FIG. 10 is a schematic diagram of an exemplary mobile telecommunications environment that includes an exemplary radio access network (RAN) that includes a mobile network operator (MNO) macrocell employing a radio node, a shared spectrum cell employing a radio node, an exemplary small cell RAN employing a multi-operator radio node located within an enterprise environment, wherein any of the radio nodes can be configured to incorporate the wireless communications circuit of FIG. 3 to enable the multi-level beam scheduling scheme.

The WCS 800 of FIG. 8, which includes the wireless communications circuit 304 of FIG. 3 to perform the in-cell beam scheduling and the in-beam UE scheduling in the wireless communications cell 306, can also be interfaced with different types of radio nodes of service providers and/or supporting service providers, including macrocell systems, small cell systems, and remote radio heads (RRH) systems, as examples. For example, FIG. 10 is a schematic diagram of an exemplary mobile telecommunications environment 1000 (also referred to as "environment 1000") that includes radio nodes and cells that may support shared spectrum, such as unlicensed spectrum, and can be interfaced to shared spectrum distributed communications systems (DCSs) 1001 supporting coordination of distribution of shared spectrum from multiple service providers to remote units to be distributed to subscriber devices. The shared spectrum DCSs 1001 can include the WCS 800 of FIG. 8 as an example.

The environment 1000 includes exemplary macrocell RANs 1002(1)-1002(M) ("macrocells 1002(1)-1002(M)") and an exemplary small cell RAN 1004 located within an enterprise environment 1006 and configured to service mobile communications between a user mobile communications device 1008(1)-1008(N) to a mobile network operator (MNO) 1010. A serving RAN for a user mobile communications device 1008(1)-1008(N) is a RAN or cell in the RAN in which the user mobile communications devices 1008(1)-1008(N) have an established communications session with the exchange of mobile communications signals for mobile communications. Thus, a serving RAN may also be referred to herein as a serving cell. For example, the user mobile communications devices 1008(3)-1008(N) in FIG. 10 are being serviced by the small cell RAN 1004, whereas user mobile communications devices 1008(1) and 1008(2) are being serviced by the macrocell 1002. The macrocell 1002 is an MNO macrocell in this example. However, a shared spectrum RAN 1003 (also referred to as "shared spectrum cell 1003") includes a macrocell in this example and supports communications on frequencies that are not solely licensed to a particular MNO and thus may service user mobile communications devices 1008(1)-1008(N) independent of a particular MNO. For example, the shared spectrum cell 1003 may be operated by a third party that is not an MNO and wherein the shared spectrum cell 1003 supports citizen broadband radio service (CBRS). Also, as shown in FIG. 10, the MNO macrocell 1002, the shared spectrum cell 1003, and/or the small cell RAN 1004 can interface with a shared spectrum DCS 1001 supporting coordination of distribution of shared spectrum from multiple service providers to remote units to be distributed to subscriber devices. The MNO macrocell 1002, the shared spectrum cell 1003, and the small cell RAN 1004 may be neighboring radio access systems to each other, meaning that some or all can be in proximity to each other such that a user mobile communications device 1008(3)-1008(N) may be able to be in communications range of two or more of the MNO macrocell 1002, the shared spectrum cell 1003, and the small cell RAN 1004 depending on the location of user mobile communications devices 1008(3)-1008(N).

In FIG. 10, the mobile telecommunications environment 1000 in this example is arranged as an LTE (Long Term Evolution) system as described by the 3GPP as an evolution of the GSM/UMTS standards (Global System for Mobile communication/Universal Mobile Telecommunications System). It is emphasized, however, that the aspects described herein may also be applicable to other network types and protocols. The mobile telecommunications environment 1000 includes the enterprise 1006 in which the small cell RAN 1004 is implemented. The small cell RAN 1004 includes a plurality of small cell radio nodes 1012(1)-1012(C). Each small cell radio node 1012(1)-1012(C) has a radio coverage area (graphically depicted in the drawings as a hexagonal shape) that is commonly termed a "small cell." A small cell may also be referred to as a femtocell or, using terminology defined by 3GPP, as a Home Evolved Node B (HeNB). In the description that follows, the term "cell" typically means the combination of a radio node and its radio coverage area unless otherwise indicated. In a non-limiting example, each of the small cell radio nodes 1012(1)-1012(C) can be configured to incorporate the wireless communications circuit 304 of FIG. 3 to perform the in-cell beam scheduling and the in-beam UE scheduling in the wireless communications cell 306.

In FIG. 10, the small cell RAN 1004 includes one or more services nodes (represented as a single services node 1014) that manage and control the small cell radio nodes 1012(1)-1012(C). In alternative implementations, the management and control functionality may be incorporated into a radio node, distributed among nodes, or implemented remotely (i.e., using infrastructure external to the small cell RAN 1004). The small cell radio nodes 1012(1)-1012(C) are coupled to the services node 1014 over a direct or local area network (LAN) connection 1016 as an example, typically using secure IPsec tunnels. The small cell radio nodes 1012(1)-1012(C) can include multi-operator radio nodes. The services node 1014 aggregates voice and data traffic from the small cell radio nodes 1012(1)-1012(C) and provides connectivity over an IPsec tunnel to a security gateway (SeGW) 1018 in a network 1020 (e.g., evolved packet core (EPC) network in a 4G network, or 5G Core in a 5G network) of the MNO 1010. The network 1020 is typically configured to communicate with a public switched telephone network (PSTN) 1022 to carry circuit-switched traffic, as well as for communicating with an external packet-switched network such as the Internet 1024.

The environment 1000 also generally includes a node (e.g., eNodeB or gNodeB) base station, or "macrocell" 1002. The radio coverage area of the macrocell 1002 is typically much larger than that of a small cell where the extent of coverage often depends on the base station configuration and surrounding geography. Thus, a given user mobile communications device 1008(3)-1008(N) may achieve connectivity to the network 1020 (e.g., EPC network in a 4G network, or 5G Core in a 5G network) through either a macrocell 1002 or small cell radio node 1012(1)-1012(C) in the small cell RAN 1004 in the environment 1000.

Figure 11:
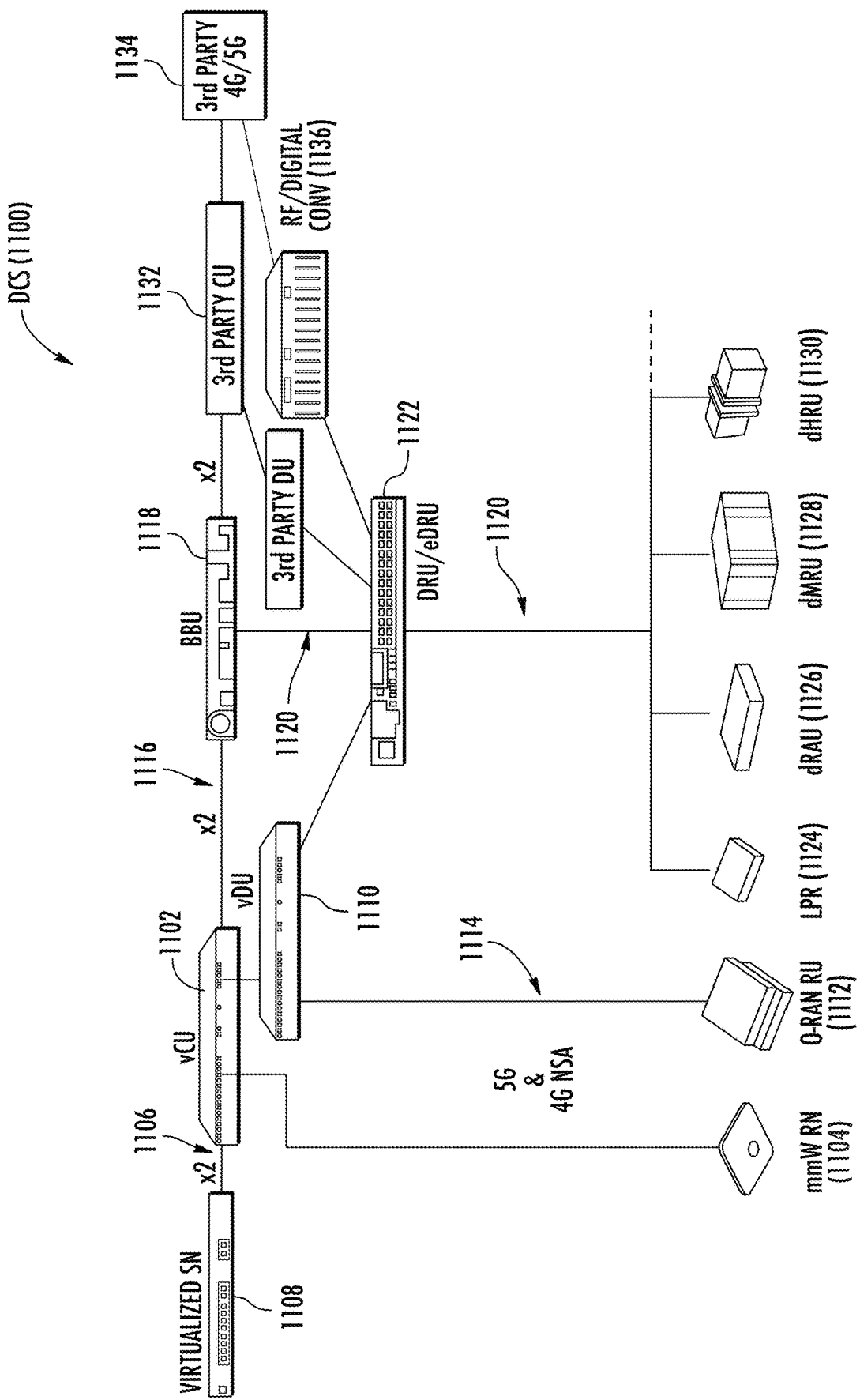
FIG. 11 is a schematic diagram an exemplary distributed communications system that supports 4G and 5G communications services, and wherein any of the radio nodes can be configured to enable the multi-level beam scheduling scheme.

FIG. 11 is a schematic diagram of another exemplary DCS 1100 that supports 4G and 5G communications services, and wherein any of the radio nodes can be configured to provide feedbackless interference estimation and suppression, according to any of the embodiments herein. The DCS 1100 supports both legacy 4G LTE, 4G/5G non-standalone (NSA), and 5G communications systems. As shown in FIG. 11, a centralized services node 1102, such as the central unit 302 in FIG. 3, is provided that is configured to interface with a core network to exchange communications data and distribute the communications data as radio signals to remote units. In this example, the centralized services node 1102 is configured to support distributed communications services to a millimeter wave (mmW) radio node 1104. The functions of the centralized services node 1102 can be virtualized through an x2 interface 1106 to another services node 1108. The centralized services node 1102 can also include one or more internal radio nodes that are configured to be interfaced with a distribution node 1110 to distribute communications signals for the radio nodes to an open RAN (O-RAN) remote unit 1112 that is configured to be communicatively coupled through an O-RAN interface 1114.

The centralized services node 1102 can also be interfaced through an x2 interface 1116 to a baseband unit (BBU) 1118 that can provide a digital signal source to the centralized services node 1102. The BBU 1118 is configured to provide a signal source to the centralized services node 1102 to provide radio source signals 1120 to the O-RAN remote unit 1112 as well as to a distributed router unit (DRU) 1122 as part of a digital DAS. The DRU 1122 is configured to split and distribute the radio source signals 1120 to different types of remote units, including a lower power remote unit (LPR) 1124, a radio antenna unit (dRAU) 1126, a mid-power remote unit (dMRU) 1128, and a high power remote unit (dHRU) 1130. The BBU 1118 is also configured to interface with a third party central unit 1132 and/or an analog source 1134 through an RF/digital converter 1136.

Figure 12:
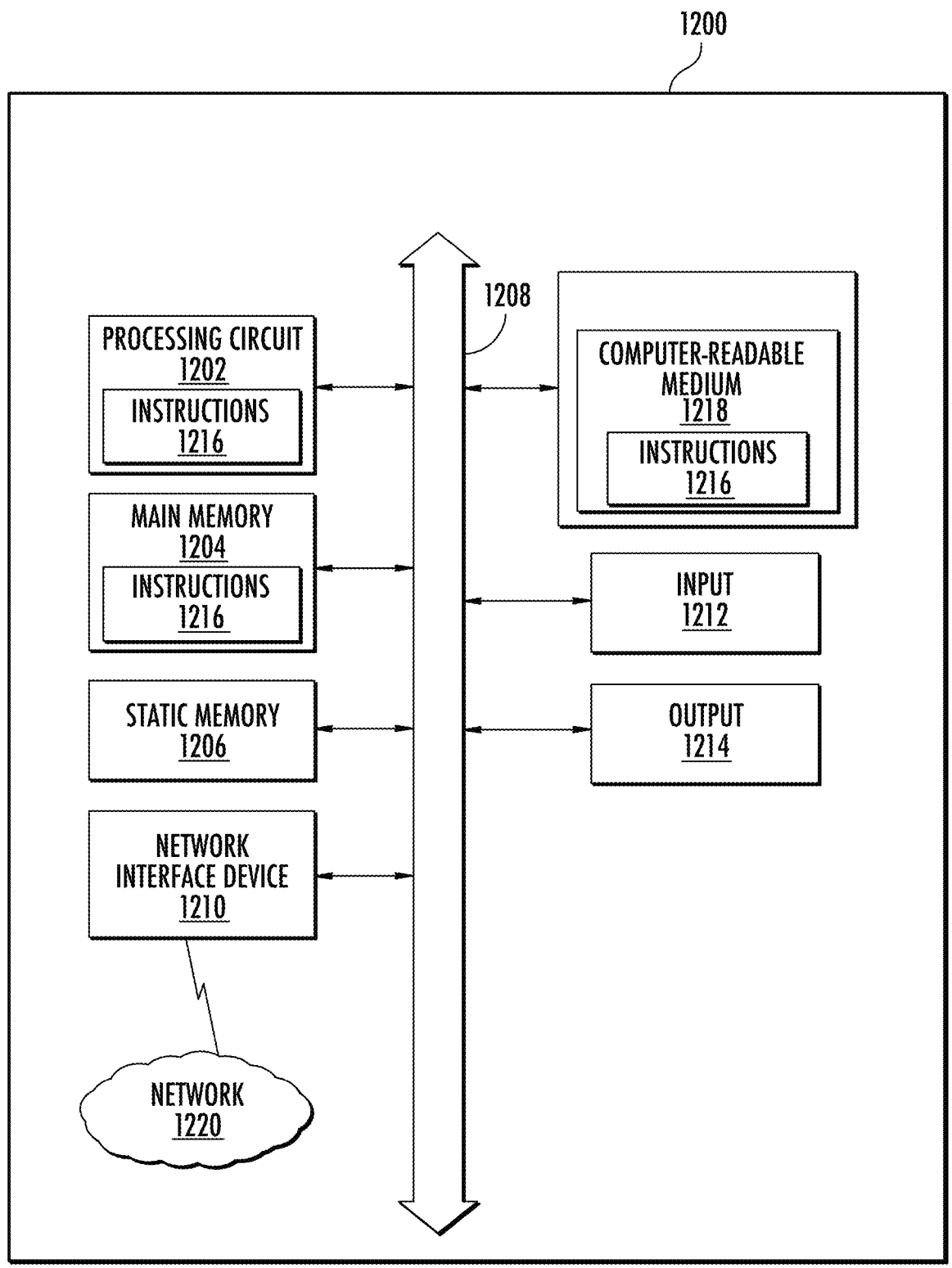
FIG. 12 is a schematic diagram of a representation of an exemplary computer system that can be included in or interface with any of the components in the wireless communications circuit of FIG. 3, wherein the exemplary computer system is configured to execute instructions from an exemplary computer-readable medium to enable the multi-level beam scheduling scheme.

Any of the circuits in the wireless communications circuit 304 of FIG. 3 (e.g., the beam control circuit 314 and the signal control circuit 316) can include a computer system 1200, such as shown in FIG. 12, to perform the in-cell beam scheduling and the in-beam UE scheduling in the wireless communications cell 306. With reference to FIG. 12, the computer system 1200 includes a set of instructions for causing the multi-operator radio node component(s) to provide its designed functionality, and their circuits discussed above. The multi-operator radio node component(s) may be connected (e.g., networked) to other machines in a LAN, an intranet, an extranet, or the Internet. The multi-operator radio node component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 1200 in this embodiment includes a processing circuit or processor 1202, a main memory 1204 (e.g., read-only memory (ROM), flash memory, dynamic random access memory (DRAM) such as synchronous DRAM (SDRAM), etc.), and a static memory 1206 (e.g., flash memory, static random access memory (SRAM), etc.), which may communicate with each other via a data bus 1208. Alternatively, the processing circuit 1202 may be connected to the main memory 1204 and/or static memory 1206 directly or via some other connectivity means. The processing circuit 1202 may be a controller, and the main memory 1204 or static memory 1206 may be any type of memory.

The processing circuit 1202 represents one or more general-purpose processing circuits such as a microprocessor, central processing unit, or the like. More particularly, the processing circuit 1202 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 1202 is configured to execute processing logic in instructions 1216 for performing the operations and steps discussed herein.

The computer system 1200 may further include a network interface device 1210. The computer system 1200 also may or may not include an input 1212 to receive input and selections to be communicated to the computer system 1200 when executing instructions. The computer system 1200 also may or may not include an output 1214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1200 may or may not include a data storage device that includes instructions 1216 stored in a computer-readable medium 1218. The instructions 1216 may also reside, completely or at least partially, within the main memory 1204 and/or within the processing circuit 1202 during execution thereof by the computer system 1200, the main memory 1204 and the processing circuit 1202 also constituting computer-readable medium. The instructions 1216 may further be transmitted or received over a network 1220 via the network interface device 1210.

While the computer-readable medium 1218 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless communications circuit, comprising:
   an antenna array configured to form a plurality of radio frequency (RF) beams in a plurality of time slots to radiate an RF communications signal to a plurality of user equipments (UEs) in a wireless communications cell;
   a beam control circuit configured to:
      determine at least one selected RF beam among the plurality of RF beams to be formed in a selected time slot among the plurality of time slots; and
      cause the antenna array to form the at least one selected RF beam in the selected time slot; and
   a signal control circuit configured to schedule one or more UEs among the plurality of UEs to communicate the RF communications signal via the at least one selected RF beam,
   wherein the beam control circuit is further configured to:
      receive a beam priority indication signal comprising one or more top priority weights corresponding to one or more prioritized RF beams, respectively, among the plurality RF beams;
      generate a plurality of summed utilities corresponding to the plurality of RF beams, respectively; and
      determine the at least one selected RF beam corresponding to a maximum summed utility among the plurality of summed utilities.

2. The wireless communications circuit of claim 1, wherein the beam control circuit is further configured to receive the beam priority indication signal in each of the plurality of time slots.

3. The wireless communications circuit of claim 1, wherein the signal control circuit is configured to schedule the one or more UEs among the plurality of UEs based on a UE scheduler selected from the group consisting of: a proportional fair scheduler, a round robin scheduler, and a quality-of-service (QoS) based scheduler.

4. The wireless communications circuit of claim 1, wherein:
   the signal control circuit is configured to schedule the one or more UEs among the plurality of UEs based on a proportional fair scheduler corresponding to a proportional metric; and
   the beam control circuit is configured to generate the plurality of summed utilities based on the proportional metric and the one or more top priority weights indicated by the beam priority indication signal.

5. A method for performing multi-level beam scheduling in a wireless communications circuit, comprising:
   radiating a radio frequency (RF) communications signal to a plurality of user equipments (UEs) in a wireless communications cell by forming a plurality of RF beams in a plurality of time slots;
   determining at least one selected RF beam among the plurality of RF beams to be formed in a selected time slot among the plurality of time slots;
   forming the at least one selected RF beam in the selected time slot;
   scheduling one or more UEs among the plurality of UEs to communicate the RF communications signal via the at least one selected RF beam;
   receiving a beam priority indication signal comprising one or more top priority weights corresponding to one or more prioritized RF beams, respectively, among the plurality RF beams;
   generating a plurality of summed utilities corresponding to the plurality of RF beams, respectively; and
   determining the at least one selected RF beam corresponding to a maximum summed utility among the plurality of summed utilities.

6. A wireless communications system (WCS), comprising:
   at least one central unit; and
   a plurality of remote units coupled to the at least one central unit via a plurality of communications mediums, the plurality of remote units configured to:
      receive a plurality of downlink digital communications signals from the at least one central unit via the plurality of communications mediums, respectively;
      convert the plurality of downlink digital communications signals into a plurality of downlink radio frequency (RF) communications signals, respectively;
      distribute the plurality of downlink RF communications signals in a plurality of wireless communications cells, respectively;
      receive a plurality of uplink RF communications signals from the plurality of wireless communications cells, respectively;
      convert the plurality of uplink RF communications signals into a plurality of uplink digital communications signals, respectively; and
      provide the plurality of uplink digital communications signals to the at least one central unit via the plurality of communications mediums, respectively;
   wherein at least one remote unit among the plurality of remote units comprises:
      an antenna array configured to form a plurality of RF beams in a plurality of time slots to radiate an RF communications signal among the plurality of downlink RF communications signals to a plurality of user equipments (UEs) in a wireless communications cell among the plurality of wireless communications cells;
a beam control circuit configured to:
  determine at least one selected RF beam among the plurality of RF beams to be formed in a selected time slot among the plurality of time slots; and
  cause the antenna array to form the at least one selected RF beam in the selected time slot; and
a signal control circuit configured to schedule one or more UEs among the plurality of UEs to communicate the RF communications signal via the at least one selected RF beam.

7. The WCS of claim 6, wherein the at least one central unit is configured to:
  generate a beam priority indication signal comprising one or more top priority weights corresponding to one or more prioritized RF beams, respectively, among the plurality RF beams; and
  provide the beam priority indication signal to the beam control circuit in the at least one remote unit.

8. The WCS of claim 7, wherein the beam control circuit is further configured to:
  generate a plurality of summed utilities corresponding to the plurality of RF beams, respectively; and
  determine the at least one selected RF beam corresponding to a maximum summed utility among the plurality of summed utilities.

9. The WCS of claim 8, wherein the signal control circuit is further configured to schedule the one or more UEs among the plurality of UEs based on a UE scheduler selected from the group consisting of: a proportional fair scheduler, a round robin scheduler, and a quality-of-service (QoS) based scheduler.

10. The WCS of claim 8, wherein:
  the signal control circuit is further configured to schedule the one or more UEs among the plurality of UEs based on a proportional fair scheduler corresponding to a proportional metric; and
  the beam control circuit is further configured to generate the plurality of summed utilities based on the proportional metric and the one or more top priority weights indicated by the beam priority indication signal.

11. The WCS of claim 7, wherein:
  the at least one central unit is further configured to support one or more higher layer networking protocols selected from the group consisting of: a packet data convergence protocol (PDCP), a radio resource management (RRC), a higher-layer (L3+) protocol comprising a transport control protocol (TCP) and an internet protocol (IP), and a self-organizing network (SON) protocol; and
  the at least one remote unit is further configured to support one or more lower layer networking protocols selected from the group consisting of: a physical (PHY) protocol, a medium access control (MAC) protocol, and a radio link control (RLC) protocol.

12. The WCS of claim 7, wherein the at least one central unit is further configured to generate the beam priority indication signal in each of the plurality of time slots.

13. The WCS of claim 6, wherein:
  the plurality of communications mediums corresponds to a plurality of optical fiber-based communications mediums, respectively;
  the at least one central unit comprises:
    a plurality of electrical-to-optical (E/O) converters configured to convert the plurality of downlink digital communications signals into a plurality of downlink optical communications signals for distribution to the plurality of remote units; and
    a plurality of optical-to-electrical (O/E) converters configured to convert a plurality of uplink optical communications signals into the plurality of uplink digital communications signals; and
  the plurality of remote units comprises:
    a plurality of remote unit O/E converters configured to convert the plurality of downlink optical communications signals into the plurality of downlink digital communications signals; and
    a plurality of remote unit E/O converters configured to convert the plurality of uplink digital communications signals into the plurality of uplink optical communications signals.

* * * * *

UNITED STATES PATENT AND TRADEMARK OFFICE
CERTIFICATE OF CORRECTION

| | | |
|---|---|---|
| PATENT NO. | : 11,362,719 B2 | Page 1 of 1 |
| APPLICATION NO. | : 16/837531 | |
| DATED | : June 14, 2022 | |
| INVENTOR(S) | : Shirish Nagaraj et al. | |

It is certified that error appears in the above-identified patent and that said Letters Patent is hereby corrected as shown below:

In the Claims

In Column 23, Line 56, in Claim 1, delete "plurality RF beams;" and insert -- plurality of RF beams; --.

In Column 24, Line 32, in Claim 5, delete "plurality RF beams;" and insert -- plurality of RF beams; --.

In Column 25, Line 19, in Claim 7, delete "plurality RF beams;" and insert -- plurality of RF beams; --.

Signed and Sealed this
First Day of October, 2024

*Katherine Kelly Vidal*

Katherine Kelly Vidal
*Director of the United States Patent and Trademark Office*